(12) United States Patent
Brennan et al.

(10) Patent No.: US 10,576,494 B2
(45) Date of Patent: Mar. 3, 2020

(54) GLASS ARTICLE PROCESSING APPARATUSES AND METHODS

(71) Applicant: CORNING INCORPORATED, Corning, NY (US)

(72) Inventors: Michael Timothy Brennan, Painted Post, NY (US); Brian Charles Cook, Elkland, PA (US); Sean Thomas Miller, Elmira, NY (US); Brian Christopher Sheehan, Elmira Heights, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 79 days.

(21) Appl. No.: 15/601,653

(22) Filed: May 22, 2017

(65) Prior Publication Data

US 2017/0333938 A1 Nov. 23, 2017

Related U.S. Application Data

(60) Provisional application No. 62/340,094, filed on May 23, 2016.

(51) Int. Cl.
*B05C 13/00* (2006.01)
*B05C 13/02* (2006.01)
(Continued)

(52) U.S. Cl.
CPC ............ *B05C 11/02* (2013.01); *A61J 1/1468* (2015.05); *B05B 13/02* (2013.01); *B05C 13/00* (2013.01); *B05C 13/02* (2013.01); *B65B 21/12* (2013.01); *B65B 21/18* (2013.01); *B65D 23/02* (2013.01); *B65D 23/0821* (2013.01); *B65D 65/42* (2013.01); *C03C 17/005* (2013.01); *C03C 17/32* (2013.01); *B05C 13/025* (2013.01); *B65G 47/90* (2013.01); *B65G 2201/0244* (2013.01)

(58) Field of Classification Search
None
See application file for complete search history.

(56) References Cited

U.S. PATENT DOCUMENTS 1,869,920 A * 8/1932 Soubier ................. C03B 9/3858
                                              239/204
2,507,127 A * 5/1950 True ........................ E21B 19/06
                                              294/199

(Continued)

FOREIGN PATENT DOCUMENTS

CN        103166154 A     6/2013
DE          2517504 A1    7/1976
(Continued)

OTHER PUBLICATIONS

International Search Report and Written Opinion dated Oct. 23, 2017, for PCT/US2017/033839 filed May 22, 2017. pp. 1-20.

*Primary Examiner* — Binu Thomas
(74) *Attorney, Agent, or Firm* — Dinsmore & Shohl LLP

(57) ABSTRACT

A glass body support assembly that supports a glass container body in an upright position includes a collet body and clamping fingers that clamp onto a necked-down portion of the glass container body. The collet body has a gas purge passageway extending therethrough to deliver pressurized gas to an interior of the glass container body.

24 Claims, 19 Drawing Sheets

(51) Int. Cl.

| | | |
|---|---|---|
| *B05C 11/02* | (2006.01) | |
| *C03C 17/00* | (2006.01) | |
| *B65D 23/08* | (2006.01) | |
| *C03C 17/32* | (2006.01) | |
| *B65D 65/42* | (2006.01) | |
| *B65B 21/12* | (2006.01) | |
| *B05B 13/02* | (2006.01) | |
| *B65B 21/18* | (2006.01) | |
| *A61J 1/14* | (2006.01) | |
| *B65D 23/02* | (2006.01) | |
| *B65G 47/90* | (2006.01) | |

(56) References Cited

U.S. PATENT DOCUMENTS

| | | | |
|---|---|---|---|
| 3,252,302 A | 5/1966 | Beers | |
| 3,787,197 A | 1/1974 | Snyder et al. | |
| 3,863,753 A * | 2/1975 | Shank, Jr. | B65B 21/12 |
| | | | 198/680 |
| 3,951,101 A | 4/1976 | Karakawa et al. | |
| 5,851,042 A * | 12/1998 | Bankuty | B65G 47/90 |
| | | | 294/106 |
| 6,523,874 B1 * | 2/2003 | Edmeyer | B65G 47/901 |
| | | | 53/247 |
| 2005/0036850 A1 | 2/2005 | Pally et al. | |
| 2008/0302300 A1 | 12/2008 | Lee | |
| 2013/0171456 A1 | 7/2013 | Fadeev et al. | |
| 2015/0217982 A1 * | 8/2015 | Groninger | B67B 3/2066 |
| | | | 53/317 |
| 2016/0221736 A1 | 8/2016 | Hayashi et al. | |

FOREIGN PATENT DOCUMENTS

| | | |
|---|---|---|
| EP | 1124064 A1 | 8/2001 |
| EP | 2511584 A1 | 10/2012 |
| EP | 2373427 B1 | 3/2013 |
| GB | 2059812 A | 4/1981 |
| JP | 3245237 B2 | 1/2002 |

* cited by examiner

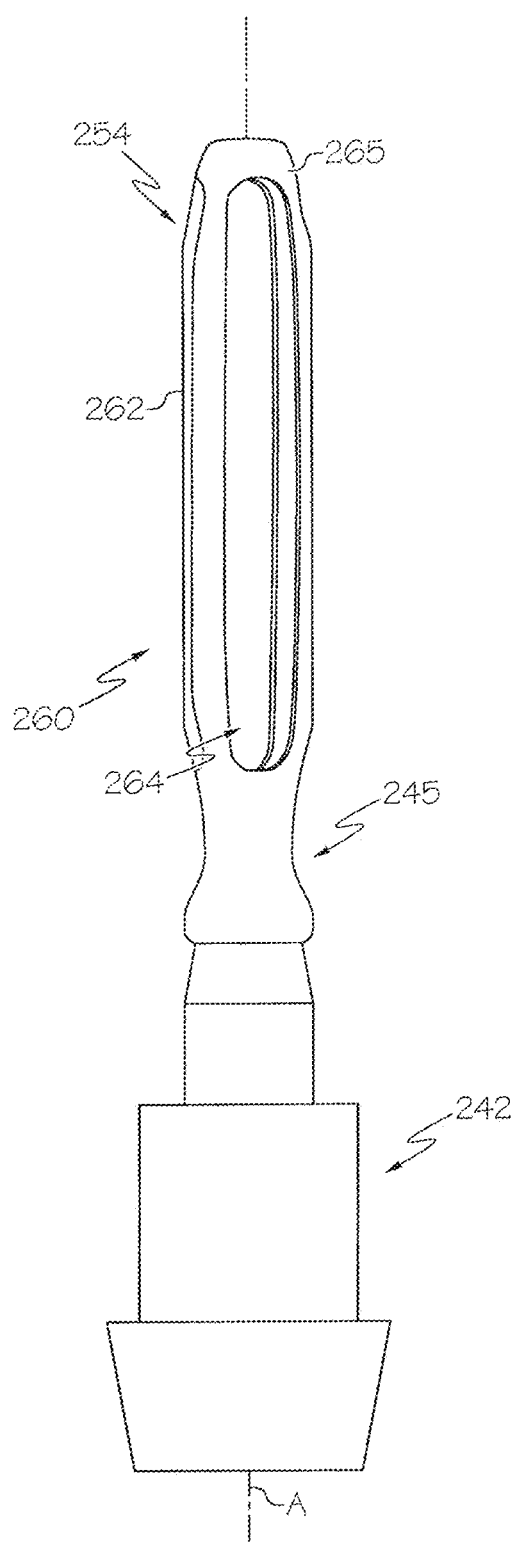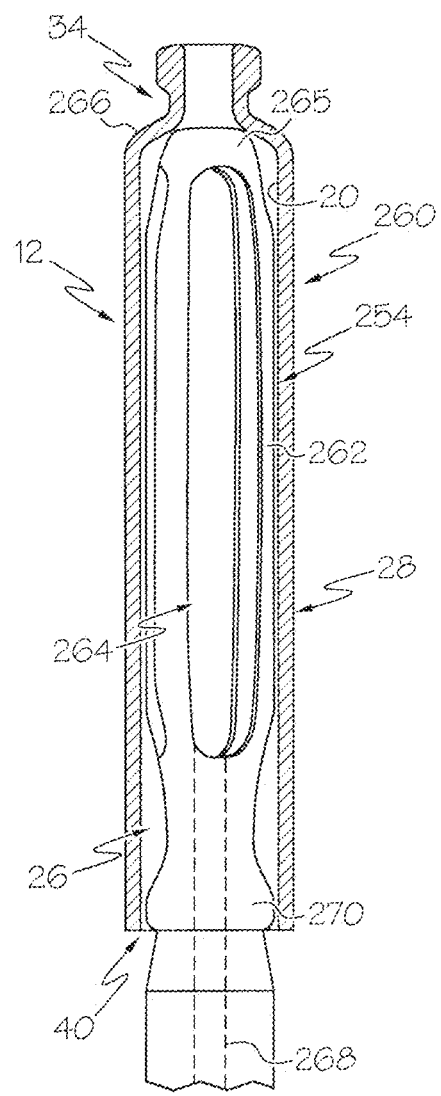
FIG. 8
FIG. 9

GLASS ARTICLE PROCESSING APPARATUSES AND METHODS

CROSS REFERENCE TO RELATED APPLICATIONS

The present application claims priority to U.S. Provisional Application No. 62/340,094 filed May 23, 2016, entitled, "Glass Article Processing Apparatuses and Methods," the entirety of which is incorporated by reference herein.

BACKGROUND

Field

The present specification generally relates to glass article apparatuses and methods and, more specifically, glass processing apparatuses and methods of applying low-friction coatings applied to glass articles, such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling.

Accordingly, a need exists for glass processing apparatuses and methods for applying coatings to glass articles to provide improved resistance to mechanical damage.

SUMMARY

According to one embodiment, a coating carrier for use with a glass coating apparatus includes a coating base comprising a plurality of spindle connector receiving features. Each spindle connector receiving feature includes a cavity that is sized to movably receive a spindle connector of a glass body support assembly that is configured to support a glass container body.

In another embodiment, a glass body support assembly that supports a glass container body in an upright position includes a collet body and clamping fingers configured to clamp onto a necked-down portion of the glass container body. The collet body having a gas purge passageway extending therethrough to deliver pressurized gas to an interior of the glass container body.

In yet another embodiment, a spindle portion for a spindle rotating apparatus includes a base and a nose portion extending outwardly from the base and configured to connect to a spindle connecting portion of a glass body support assembly. A magnet is located in at least one of the base and the nose portion that is arranged to apply a magnetic force to resist axial movement of the spindle connecting portion when engaged with the nose portion.

Additional features and advantages of the coated glass articles and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 8 illustrates a perspective view of a glass body support assembly, according to one or more embodiments shown and described herein;

FIG. 9 illustrates a glass container connecting portion of the glass body support assembly of FIG. 8, according to one or more embodiments shown and described herein;

DETAILED DESCRIPTION

Reference will now be made in detail to various embodiments of low-friction coatings, glass articles with low-friction coatings, apparatuses and methods for producing the same, examples of which are schematically depicted in the figures. Such coated glass articles may be glass containers suitable for use in various packaging applications including, without limitation, as pharmaceutical packages. These pharmaceutical packages may or may not contain a pharmaceutical composition. Various embodiments of the low-friction coatings, glass articles with low-friction coatings, and methods for forming the same will be described in further detail herein with specific reference to the appended drawings. While embodiments of the low-friction coatings described herein are applied to the outer surface of a glass container, it should be understood that the low-friction coatings described may be used as a coating on a wide variety of materials, including non-glass materials and on substrates other than containers including, without limitation, glass display panels and the like.

Generally, a low-friction coating may be applied to a surface of a glass article, such as a container that may be used as a pharmaceutical package. The low-friction coating may provide advantageous properties to the coated glass article such as a reduced coefficient of friction and increased damage resistance. The reduced coefficient of friction may impart improved strength and durability to the glass article by mitigating frictive damage to the glass. Further, the low-friction coating may maintain the aforementioned improved strength and durability characteristics following exposure to elevated temperatures and other conditions, such as those experienced during packaging and pre-packaging steps utilized in packaging pharmaceuticals, such as, for example, depyrogenation, autoclaving and the like.

Accordingly, the low-friction coatings and glass articles with the low-friction coating are thermally stable.

The low-friction coating may generally comprise a coupling agent, such as a silane, and a polymer chemical composition, such as a polyimide. In some embodiments, the coupling agent may be disposed in a coupling agent layer positioned on the surface of the glass article and the polymer chemical composition may be disposed in a polymer layer positioned on the coupling agent layer. In other embodiments, the coupling agent and the polymer chemical composition may be mixed in a single layer.

Figure 1:
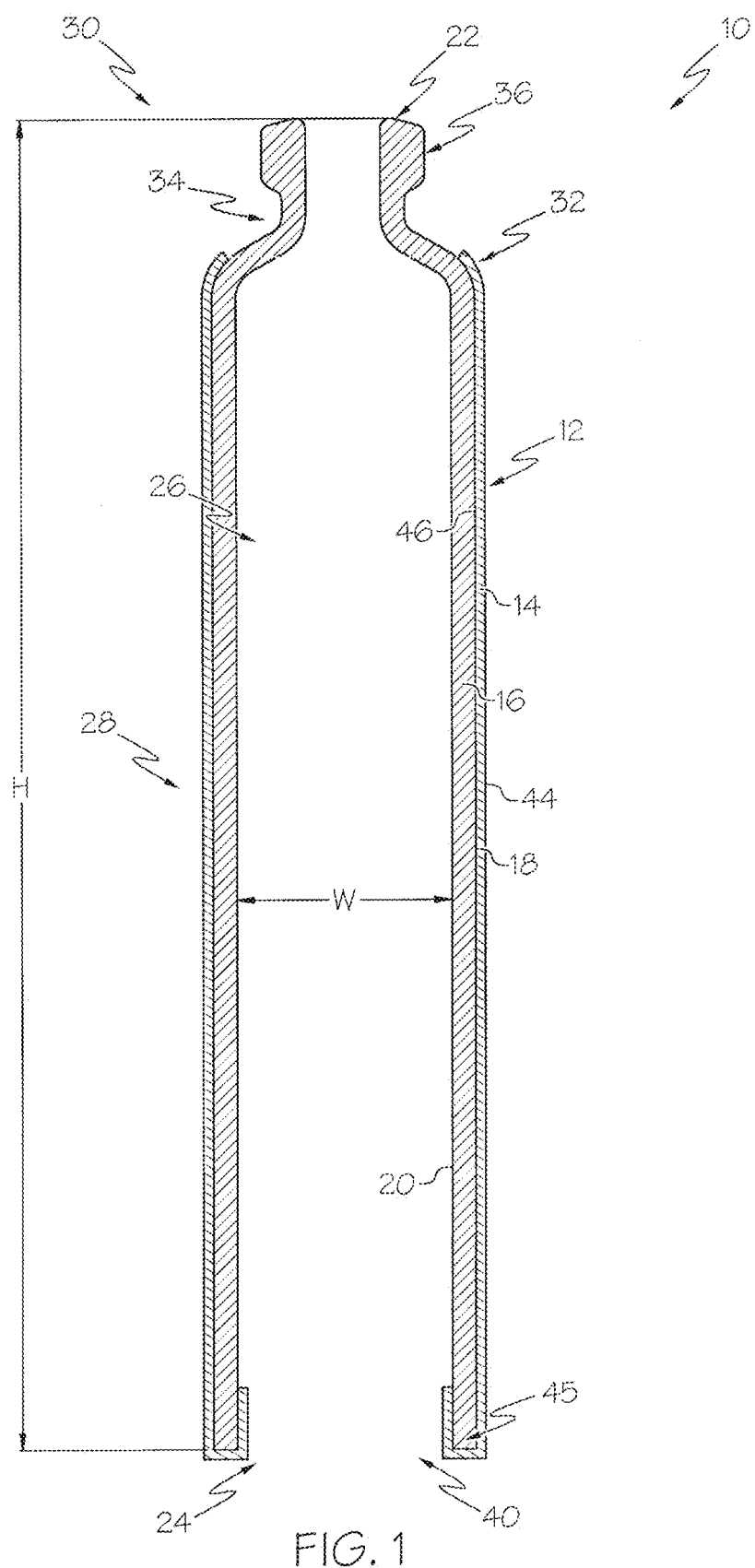
FIG. 1 schematically depicts a cross section of a glass container with a low-friction coating, according to one or more embodiments shown and described herein.

Referring to FIG. 1, a coated glass article in the form of a glass container 10 is shown in cross section. The coated glass container 10 comprises a glass container body 12 and a low-friction coating 14. The glass container body 12 has a glass container wall 16 extending between an exterior surface 18 (i.e., a first surface) and an interior surface 20 (i.e., a second surface). The glass container body 12 generally has a top end 22 and a bottom end 24 that is opposite the top end 22. The interior surface 20 of the glass container wall 16 defines an interior volume 26 of the coated glass container 10.

In the illustrated example, the coated glass container 10 includes a body portion 28 and a necked-down portion 30 at the top end 22. The necked-down portion 30 includes a shoulder region 32 that decreases in a widthwise dimension (e.g., diameter) to a neck region 34. The neck region 34 may have a substantially constant inner and/or outer diameter along at least a portion of its height to a flange region 36, where the outer diameter increases to overhang at least a portion of the shoulder region 32 at locations beyond the neck region 34. In some embodiments, an inner diameter in the flange region 36 may be substantially the same as the inner diameter in the neck region 34, thereby providing a substantially constant inner diameter along the neck region 34 to an opening 35 at the top end 22. In other embodiments, the inner diameters in the flange region 36 and the neck region 34 may be different. The bottom end 24 of the glass container body 12 may include an open end 40. In some embodiments, an inner diameter (and outer diameter) at the open end 40 may be substantially constant along a height H of the glass container body 12 along the body portion 28 to the necked-down portion 30. In some embodiments, the outer diameter of the flange region 36 may be less than the outer diameter (and inner diameter) of the body portion 28. The open end 40 of the glass container body 12 can facilitate insertion of a device, such as a plunger that can seal against the interior surface 20 of the glass container wall 16 in a reliable fashion.

The height H of the glass container body 12 is greater than a width W (e.g., outer diameter) of the glass container body 12. In some embodiments, the height H of the glass container body 12 may be at least about 2 times or more, such as about 2.5 times or more, such as about 3 times or more, such as about 3.5 times or more, such as about 4 times or more, such as about 4.5 times or more, such as about 5 times or more than the width W of the glass container body 12. As will be described in greater detail below, such relatively large height H to width W ratios can present unique problems during coating processes where the glass container bodies 12 are rotated at relatively high speeds.

A low friction coating 14 is applied to the glass container body 12. The low friction coating 14 is positioned on at least a portion of the exterior surface 18 of the glass container body 12. The low friction coating 14 includes an exterior contact surface 44 and an interior glass interface surface 46 that can be bonded to the exterior surface 18 of the glass container body 12. In the illustrated example, the low friction coating 14 may be primarily located along the body portion 28. This is because the body portion 28 may present the largest outer diameter, which can be more susceptible to contact with surrounding objects. It may also be desirable to provide the low friction coating 14 at the open end 40 of the glass container body 12. This is because the open end 40 of the glass container body 12 may provide a base for the coated glass container 10 during, for example, a filling operation and come into contact with multiple types of support surfaces (e.g., conveyor surfaces).

Conversely, it may be undesirable to provide the low friction coating 14 within the interior of the coated glass container 10, or at least along interior regions of the coated glass container 10 that may contact a medicament, hormone or other substance for treatment. In some embodiments, the low friction coating 14 may be applied within certain regions of the coated glass container 10 that will not be exposed to contents of the coated glass container 10, such as along a bottom interior portion 45 that may be located below or outside a plunger that is inserted during a filling operation or along the shoulder region 32, neck region 34 and flange region 36. In the illustrated embodiment, the low friction coating 14 extends over only a portion of the shoulder region 32, terminating below the neck region 34. Such an arrangement can aid in preventing the low friction coating 14 from entering the interior of the glass container body 12 through the opening 35 at the top end 22.

In one embodiment, the coated glass container 10 is a pharmaceutical package. The coated glass container 10 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
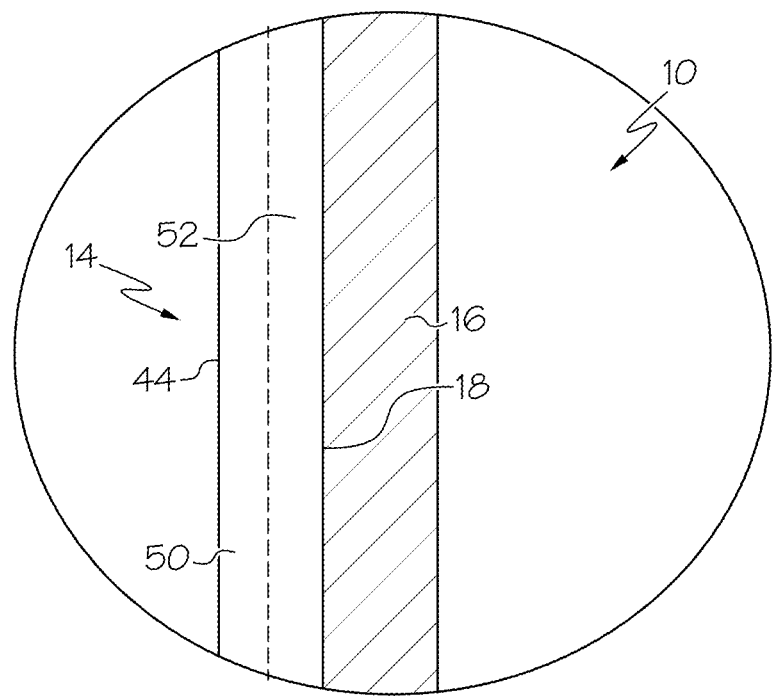
FIG. 2 schematically depicts a cross section of a glass container with a low-friction coating comprising a polymer layer and a coupling agent layer, according to one or more embodiments shown and described herein.

Now referring to FIG. 2, in some embodiments, the low-friction coating 14 includes a bi-layered structure. FIG. 2 shows a cross section of the coated glass container 10, where the low-friction coating comprises a polymer layer 50 and a coupling agent layer 52. A polymer chemical composition may be contained in polymer layer 50 and a coupling agent may be contained in a coupling agent layer 52. The coupling agent layer 52 may be in direct contact with the exterior surface 18 of the glass container wall 16. The polymer layer 50 may be in direct contact with the coupling agent layer 52 and may form the exterior surface 44 of the low-friction coating 14. In some embodiments, the coupling agent layer 52 is bonded to the glass container wall 16 and the polymer layer 50 is bonded to the coupling agent layer 52 at an interface. However, it should be understood that, in some embodiments, the low-friction coating 14 may not include a coupling agent, and the polymer chemical composition may be disposed in a polymer layer 50 in direct contact with the exterior contact surface 44 of the of the glass container wall 16. In another embodiment, the polymer chemical composition and coupling agent may be substantially mixed in a single layer. In some other embodiments, the polymer layer may be positioned over the coupling agent layer, meaning that the polymer layer 50 is in an outer layer relative to the coupling agent layer 52, and the glass wall 16. As used herein, a first layer positioned "over" a second layer means that the first layer could be in direct contact with the second layer or separated from the second layer, such as with a third layer disposed between the first and second layers.

Figure 3:
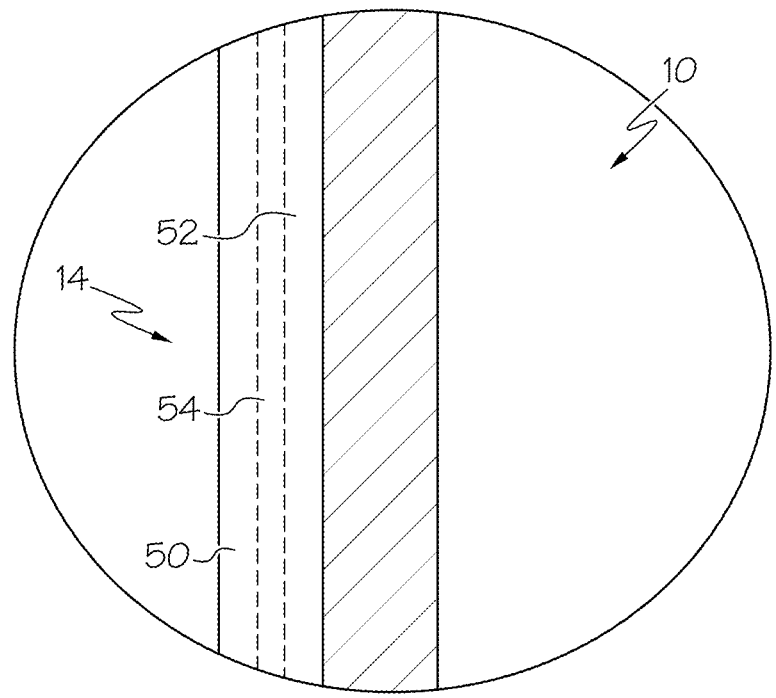
FIG. 3 schematically depicts a cross section of a glass container with a low-friction coating comprising a polymer layer, a coupling agent layer, and an interface layer, according to one or more embodiments shown and described herein.

Referring now to FIG. 3, in one embodiment, the low-friction coating 14 may further comprise an interface layer 54 positioned between the coupling agent layer 52 and the polymer layer 50. The interface layer 54 may comprise one or more chemical compositions of the polymer layer 50 bound with one or more of the chemical compositions of the coupling agent layer 52. In this embodiment, the interface of the coupling agent layer 52 and polymer layer 50 forms the interface layer 54 where bonding occurs between the polymer chemical composition and the coupling agent. However, it should be understood that in some embodiments, there may be no appreciable layer at the interface of the coupling agent layer 52 and polymer layer 50 where the polymer and coupling agent are chemically bound to one another as described above with reference to FIG. 2.

The low-friction coating 14 applied to the glass container body 12 may have a thickness of less than about 100 μm or even less than or equal to about 1 μm. In some embodiments, the thickness of the low-friction coating 14 may be less than or equal to about 100 nm thick. In other embodiments, the low-friction coating 14 may be less than about 90 nm thick, less than about 80 nm thick, less than about 70 nm thick, less than about 60 nm thick, less than about 50 nm, or even less than about 25 nm thick. In some embodiments, the low-friction coating 14 may not be of uniform thickness over the entirety of the glass container body 12. For example, the coated glass container 10 may have a thicker low-friction coating 14 in some areas, due to the process of contacting the glass container body 12 with one or more coating solutions that form the low-friction coating 14. In some embodiments, the low-friction coating 14 may have a non-uniform thickness. For example, the coating thickness may be varied over different regions of the coated glass container 10, which may promote protection is a selected region.

In embodiments which include at least two layers, such as the polymer layer 50, interface layer 54, and/or coupling agent layer 52, each layer may have a thickness of less than about 100 μm or even less than or equal to about 1 μm. In some embodiments, the thickness of each layer may be less than or equal to about 100 nm. In other embodiments, each layer may be less than about 90 nm thick, less than about 80 nm thick, less than about 70 nm thick, less than about 60 nm thick, less than about 50 nm, or even less than about 25 nm thick.

The glass containers to which the low-friction coating 14 may be applied may be formed from a variety of different glass compositions. The specific composition of the glass article may be selected according to the specific application such that the glass has a desired set of physical properties.

The glass containers may be formed from a glass composition which has a coefficient of thermal expansion in the range from about $25 \times 10^{-7}$/° C. to $80 \times 10^{-7}$/° C. For example, in some embodiments described herein, the glass container body 12 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like In some embodiments described herein, the glass container body 12 is strengthened such as by ion-exchange strengthening, herein referred to as "ion-exchanged glass". For example, the glass container body 12 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass container body 12 may have a depth of layer greater than or equal to 20 μm. In some of these embodiments, the depth of layer may be greater than 50 μm or even greater than or equal to 75 μm. In still other embodiments, the depth of the layer may be up to or greater than 100 μm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass container body 12 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However it should be understood that the coated glass containers 10 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B aluminosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85\times10^{-7}$ °C.$^{-1}$ When the coated glass articles described herein are glass containers, the glass container body 12 of the coated glass containers 10 may take on a variety of different forms. For example, the glass container bodies 12 described herein may be used to form coated glass containers 10 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the low-friction coating 14. Alternatively, other strengthening methods such as heat tempering, flame polishing, and laminating, as described in U.S. Pat. No. 7,201,965, could be used to strengthen the glass before coating.

Figure 4:
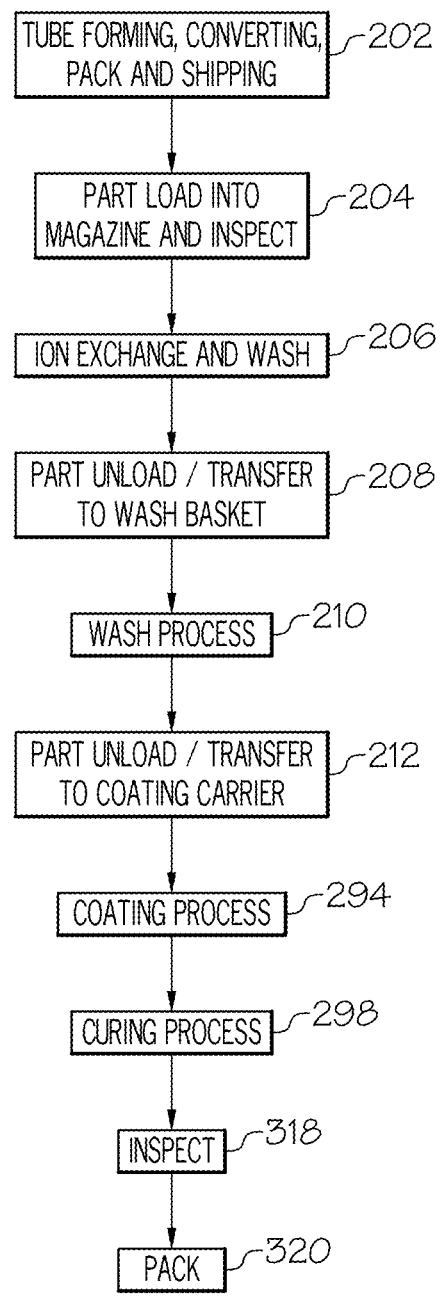
FIG. 4 illustrates a method of forming and processing a glass container body, according to one or more embodiments shown and described herein.

Referring now to FIG. 4, a method 200 for producing the coated glass container 10 having a low-friction coating 14 is shown. At step 202, preformed glass bodies are formed using any suitable process from an ion exchangeable glass composition, packed and transported and transported to an ion exchange station. The preformed glass bodies may then be loaded into magazines, e.g., using a mechanical loader, which is capable of gripping multiple preformed glass bodies and the preformed glass bodies may be inspected at step 204. The magazine loader may be coupled to a robotic arm or other, similar device capable of positioning the magazine loader with respect to the preformed glass bodies and the magazine.

At step 206, the preformed glass bodies may be processed through an ion exchange process, as described above. The preformed glass bodies may be processed en masse by loading multiple magazines into cassettes, which are sized and configured to retain multiple ones of the magazines, such that a large number of preformed glass bodies can be processed simultaneously. Each magazine may be positioned in a cassette using a cassette loader, such as a mechanical gripping device. The cassette loader may be coupled to a robotic arm or other, similar device capable of positioning the cassette loader with respect to the cassette and the magazine.

The cassette containing the magazines and preformed glass bodies may then be transferred to an ion exchange station and loaded into an ion exchange tank to facilitate strengthening of the preformed glass container bodies 12 described above. The cassette may be transferred to the ion exchange station using a cassette transfer device, such as a mechanical gripping device. The cassette transfer device may be coupled to a robotic arm or other device capable of positioning the cassette to the ion exchange station.

Once the cassette transfer device and attached cassette are at the ion exchange station, the cassette and the preformed glass bodies contained therein may be preheated prior to immersing the cassette and the preformed glass bodies in the ion exchange tank. The cassette may be preheated to a temperature greater than room temperature and less than or equal to the temperature of the molten salt bath in the ion exchange tank. For example, the preformed glass bodies may be preheated to a temperature from about 300° C.-500° C.

The ion exchange tank can contain a bath of molten salt, such as a molten alkali salt, such as $KNO_3$, $NaNO_3$ and/or combinations thereof. In one embodiment, the bath of molten salt is 100% molten $KNO_3$ which is maintained at a temperature greater than or equal to about 350° C. and less than or equal to about 500° C. However, it should be understood that baths of molten alkali salt having various other compositions and/or temperatures may also be used to facilitate ion exchange of the preformed glass bodies.

The preformed glass bodies are ion exchange strengthened in the ion exchange tank. Specifically, the preformed glass bodies are immersed in the molten salt and held there for a period of time sufficient to achieve the desired compressive stress and depth of layer in the preformed glass bodies. For example, in one embodiment, the preformed glass bodies may be held in the ion exchange tank for a time period sufficient to achieve a depth of layer of up to about 100 μm with a compressive stress of at least about 300 MPa or even 350 MPa. The holding period may be less than 30 hours or even less than 20 hours. However it should be understood that the time period with which the preformed glass bodies are held in the tank may vary depending on the composition of the preformed glass bodies, the composition of the bath of molten salt, the temperature of the bath of molten salt, and the desired depth of layer and the desired compressive stress.

After the preformed glass bodies are ion exchange strengthened, the cassette and glass bodies can be removed from the ion exchange tank using the cassette transfer device in conjunction with a robotic arm or overhead crane. During removal from the ion exchange tank, the cassette with the preformed glass bodies can be suspended over the ion exchange tank and the cassette can be rotated about a horizontal axis such that any molten salt remaining in the glass bodies is emptied back into the ion exchange tank. Thereafter, the cassette is rotated back to its initial position and the glass bodies are allowed to cool prior to being rinsed.

The cassette and glass bodies can then be transferred to a rinse station with the cassette transfer device. This transfer may be performed with a robotic arm or overhead crane, as described above, or alternatively, with an automatic conveyor such as a conveyor belt or the like. The cassette and glass bodies can be lowered into a rinse tank containing a water bath to remove any excess salt from the surfaces of the glass bodies. The cassette and glass bodies may be lowered into the rinse tank with a robotic arm, overhead crane or similar device which couples to the cassette transfer device. The cassette and glass bodies can then be withdrawn from the rinse tank, suspended over the rinse tank, and the cassette can be rotated about a horizontal axis such that any rinse water remaining in the glass bodies is emptied back into the rinse tank. In some embodiments, the rinsing operation may be performed multiple times before the cassette and glass bodies are moved to the next processing station.

The magazines may be removed from the cassette with the cassette loader. Thereafter, the glass bodies may be unloaded from the magazine with the magazine loader and transferred to a washing station at step 208. The glass bodies can be washed with a jet of de-ionized water emitted from a nozzle at step 210. The jet of de-ionized water may be mixed with compressed air. The glass bodies can be transferred to an inspection station where the glass containers are inspected for flaws, debris, discoloration and the like.

Steps 202-210 may be referred to as pre-coating steps where the glass bodies are formed and strengthened prior to a coating operation. Aspects of the present disclosure are particularly directed to subsequent coating steps, where the glass bodies are coated to form the coated glass containers 10, illustrated by FIG. 1. The glass bodies may then be transferred to racks. The racks may be the same or different structures than the magazines discussed above. Additionally, the glass bodies may be transferred to the racks by a mechanical loader, which may be a gripping device and be coupled to a robotic arm.

Figure 5:
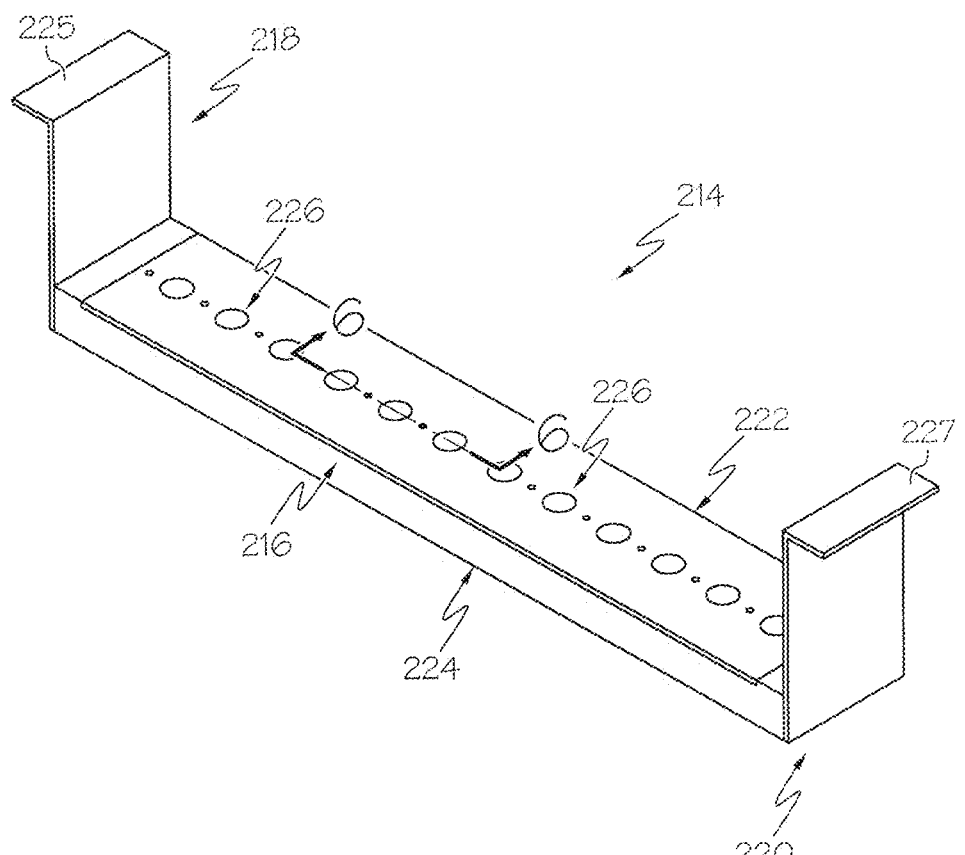
FIG. 5 schematically illustrates a perspective view of a coating carrier, according to one or more embodiments shown and described herein.

At step 212, the glass bodies may be transferred from the racks to a coating carrier that can be used to provide a discrete number of the glass bodies to a glass coating station. Referring to FIG. 5, an exemplary coating carrier 214 is configured to support a number of the glass container bodies 12 thereon for transport and use through a glass coating station. The coating carrier 214 includes a coating base 216 that extends between a pair of support arms 218 and 220. The coating base 216 may be substantially flat, having a substantially planar glass body supporting side 222 and an opposite, substantially planar spindle connector side 224. The support arms 218 and 220 may be provided with outwardly turned fingers 225 and 227 to connect or mount the coating carrier 214 to various structures during the coating process.

Extending between the glass body supporting side 222 and the spindle connector side 224 are a series of spindle connector receiving features 226. In the illustrated embodiment, 12 spindle connector receiving features 226 are provided, however, more or less than 12 spindle connector receiving features may be used. Each spindle connector receiving feature 226 may be sized to moveably receive a spindle connector of a glass body support assembly.

Figure 6:
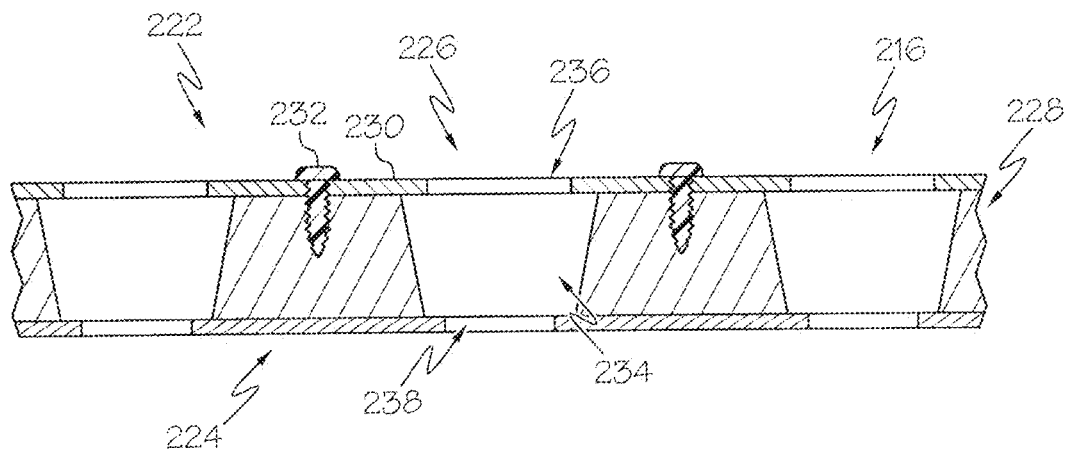
FIG. 6 schematically illustrates a partial, section view of the coating carrier along line 6-6 of FIG. 5.

Referring briefly to FIG. 6, the coating base 216 includes a support body 228 and a connector plate 230 that is connected to the support body 228, e.g., using fasteners 232 or any other suitable connection. The spindle connector receiving features 226 are each formed as a cavity 234, with the cavities 234 being substantially evenly spaced from one another and located side-by-side to form a row of the spindle connector receiving features 226. The spindle connector receiving features 226 have an opening 236 at the glass body supporting side 222 and an opening 238 at the spindle connector side 224. The openings 236 and 238 connect to the cavity 234, which tapers in width (e.g., diameter) from the glass body supporting side 222 to the spindle connector side 224, forming a truncated cone shape. The opening 236 at the glass body supporting side 222 may be formed through the connector plate 230 and the opening 238 at the spindle connector side 224 may be formed through the support body 228. In some embodiments, the opening 238 at the spindle connector side 224 may be formed through another connector plate.

Figure 7:
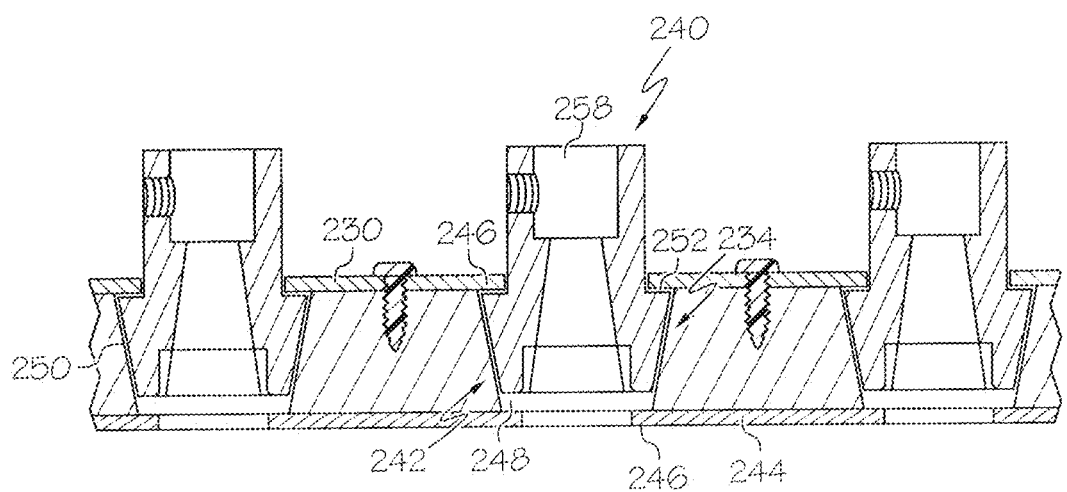
FIG. 7 schematically illustrates another partial, section view of the coating carrier of FIG. 5 with spindle connectors of glass body support assemblies, according to one or more embodiments shown and described herein.

Referring also to FIG. 7, the cavities 234 are sized to receive spindle connectors 240 of a glass body support assembly 245 (FIG. 8). The cone shape of the cavities 234 is sized to receive a spindle connecting portion 242 of the spindle connectors 240. In the illustrated embodiment, the spindle connecting portions 242 also have a truncated cone shape that nests with (or bottoms out on) the cone shape of the cavities 234. As can be seen by FIG. 7, the spindle connecting portions 242 bottom out in the cavities 234 at a location spaced from a bottom wall 244 of the support body 228. The bottom wall 244 extends under the cavities 234, providing a ledge 246 that defines the openings 238 at the spindle connector side 224. The opening 238 is smaller in diameter/width than a bottom 248 of the cavities 234 defined by cavity walls 250. A gap 251 can be provided with the spindle connecting portions 242 bottomed out in the cavities 234.

The connector plate 230 extends over the cavities 234, providing a ledge 246 that defines the openings 236 at the glass body supporting side 222. The opening 236 is smaller in diameter/width than a top 252 of the cavities 234 defined by the cavity walls 250. The ledge 246 can be used to trap the spindle connecting portions 242 within the cavities 234, while providing enough space to allow the spindle connecting portions 242 to rotate therein during a coating operation. Removing the connector plate 230 from the support body 228 can allow for removal of the spindle connecting portions 242 from the cavities 234.

Referring to FIG. 8, the glass body support assembly 245 includes a glass container connecting portion 254 that releasably connects to the spindle connecting portion 242. The glass container connecting portion 254 is in the form of a pin that includes a connecting base 256 that is sized to be received within a bore 258 of the spindle connecting portion 242 (FIG. 7). A connecting head 260 extends outwardly from the connecting base 256 defining an elongated axis A that extends along a length of the glass container connecting portion 254. The connecting head 260 may include engaging ribs 262 that extend from the connecting base 256, spaced from one another and reconnect at an outer end 265. The engaging ribs 262 may be spaced from each other to provide gas flow openings 264 therebetween. The glass container connecting portion 254 may be formed of any material that is suitable for contacting an interior of the coated glass container 10 and can engage the glass container wall 16 (FIG. 1), such as Delrin® acetal homopolymer resin, commercially available from DuPont.

It should be noted that while the coating carrier 214 provides the ability to utilize multiple glass body support assemblies 245 and spindle connecting portions 242 simultaneously, which can increase throughput, a single glass body support assembly 245 and corresponding spindle connecting portion 242 may be utilized in some embodiments. FIG. 8 illustrates a single glass body support assembly 245 and spindle connecting portion 242 that may be connected to a spindle rotating apparatus 272 (FIG. 10A).

Referring to FIG. 9, the glass container connecting portion 254 including the connecting head 260 is shown inserted into the interior volume 26 of the glass container body 12 for a coating operation. In this embodiment, the connecting head 260 is inserted into the glass container body 12 a distance such that the outer end 265 of the connecting head 260 engages the interior surface 20 of the glass container body 12 at the neck region 34, or at a location between the neck region 34 and an outer shoulder turn location 266. A width of the connecting head 260 at the engaging ribs 262 may be selected such that the engaging ribs 262 engage the interior surface 20 of the glass container body 12 along the height of the body portion 28. Such contact of the engaging ribs 262 against the interior surface 20 of the glass container body 12 can hold the glass container body 12 in place on the connecting head 260 via contact pressure at four surface locations associated with each engaging rib 262.

The glass container connecting portion 254 has a gas purge passageway 268 that extends therethrough. The gas purge passageway 268 is in communication with the gas flow openings 264 located between adjacent engaging ribs 262. In some embodiments, the glass container connecting portion 254 may include a bump out portion 270 of increased width (e.g., diameter) that is positioned within the interior volume 26 of the glass container body 12, near the end 40 with the connecting head 260 received by the glass container body 12. The bump out portion 270 can provide a shield or blockage at the end 40 while also facilitating a back pressure of gas within the interior volume 26. This shield and back pressure can inhibit entry of coating material into the interior volume 26 during a coating operation.

Figure 10:
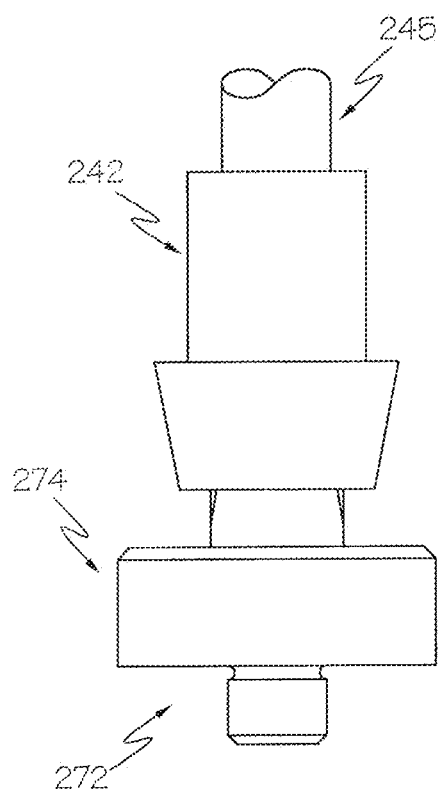
FIG. 10 illustrates a spindle portion of a spindle rotating apparatus, according to one or more embodiments shown and described herein.
Figure 10A:
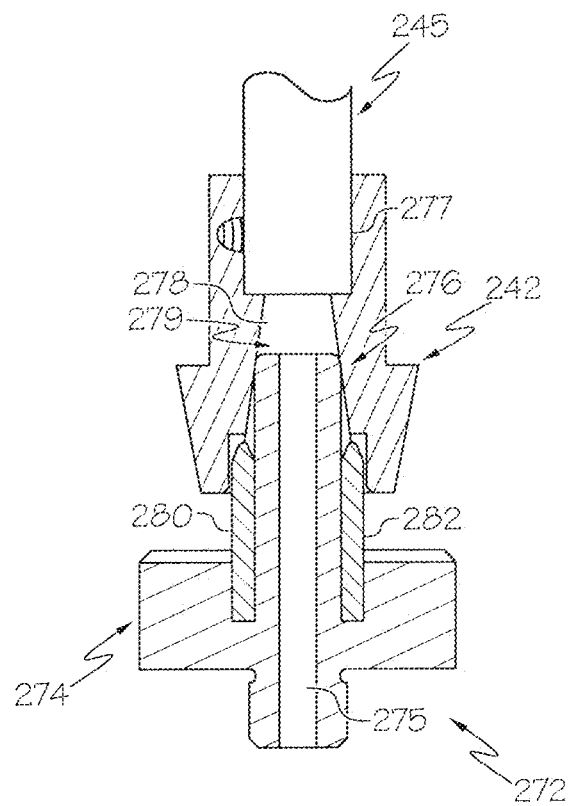
FIG. 10A illustrates a section view of the spindle rotating apparatus of FIG. 10.
Figure 11:
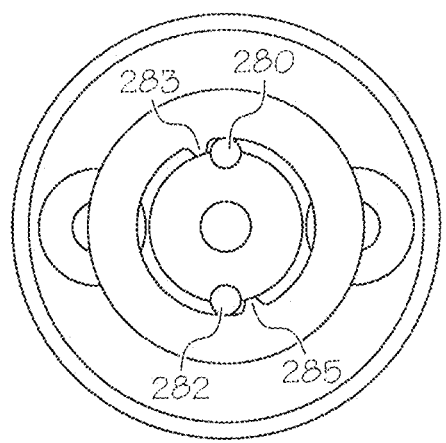
FIG. 11 illustrates a bottom section view of the spindle rotating apparatus of FIG. 10.

Referring now to FIGS. 10 and 10A, the spindle connecting portions 242 each connect to a respective spindle rotating apparatus 272. In FIGS. 10 and 10A only a spindle portion 274 of the spindle rotating apparatus 272 is illustrated that connects to the spindle connecting portions 242 of the glass body support assembly 245. Any suitable spindle rotating apparatus 272 can be used including belt-driven or integral motor-driven apparatuses. As can be seen in FIG. 10A, the spindle rotating apparatus 272 includes a cone-shaped nose portion 276 that is sized and shaped to be received within a spindle receiving bore 278 of the spindle connecting portion 242. A gas purge passageway 275 extends through the spindle portion 274 for connecting with the gas purge passageway 268 through the glass container connecting portion 254 and a corresponding gas purge passageway 277 through the spindle connecting portion 242. The spindle receiving bore 278 may include a corresponding cone shape, such that the spindle connecting portion 242 can bottom out on the nose portion 276 when placed thereon while still positioned within the coating carrier 214 (FIG. 8). Referring to FIGS. 10A and 11, in some embodiments, the spindle portion 274 may include mating pins 280 and 282 that can engage radial projections 283, 285 of the spindle connecting portion 242. The mating pins 280 and 282 can inhibit mechanical slipping, particularly at relatively high rotation speeds (e.g., greater than about 200 rpm, such as at least about 300 rpm).

Figure 12:
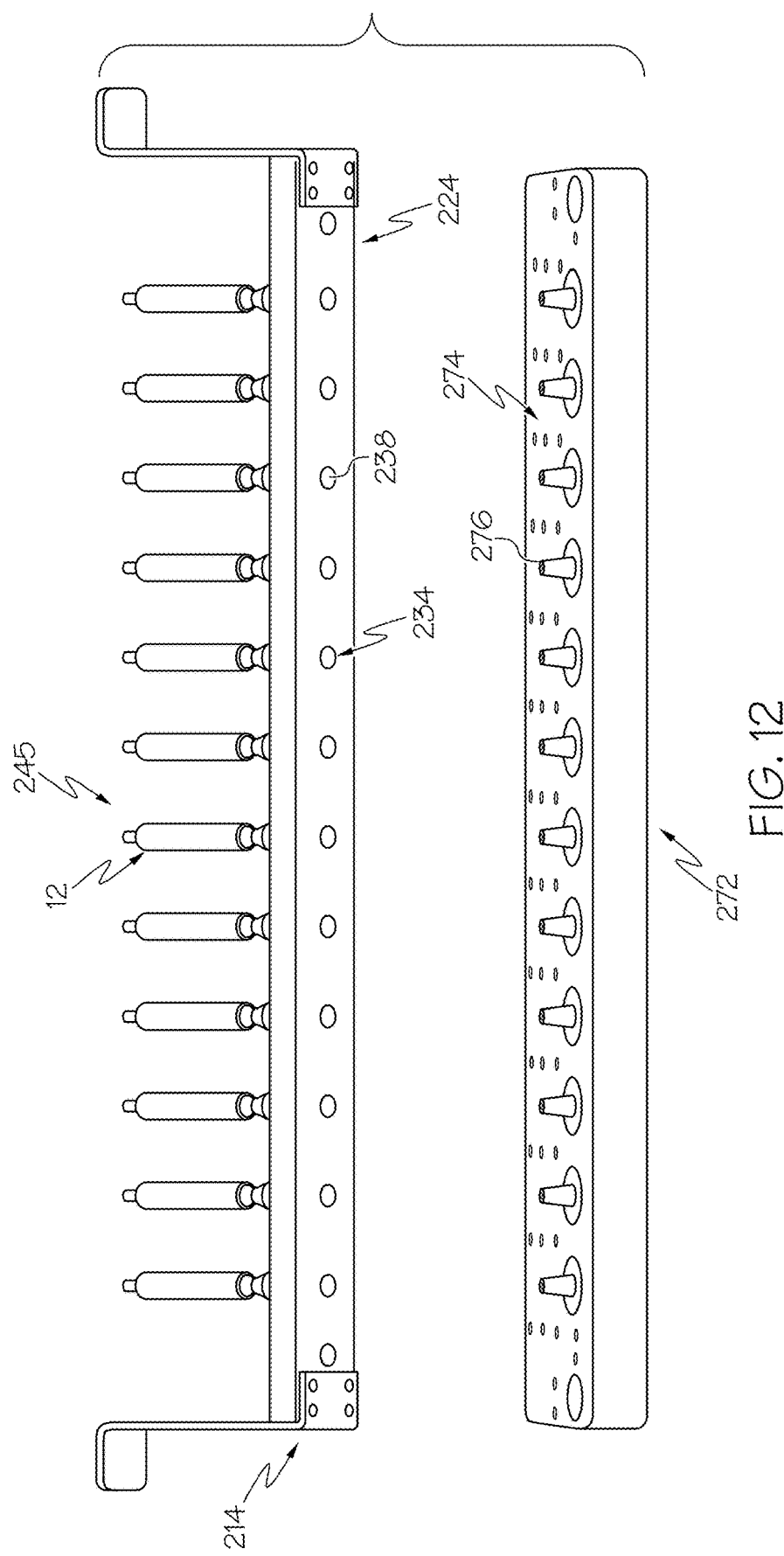
FIG. 12 illustrates a connecting operation where the coating carrier of FIG. 5 is connected to a spindle rotating apparatus, according to one or more embodiments shown and described herein.

Referring to FIG. 12, in a connecting operation, the coating carrier 214 including the glass body support assemblies 245 having the glass container bodies 12 supported thereon, as described above, may be transferred to the spindle rotating apparatus 272 including the spindle portions 274. In some embodiments, the spindle rotating apparatus 272 may include the same number of spindle portions 274 as glass body support assemblies 245 in order to coat a number of the glass container bodies 12 simultaneously. However, the spindle rotating apparatus 272 may include more or less than the number of glass body support assemblies 245. In some embodiments, a single spindle rotating apparatus 272 may include a number of the spindle portions 274. In some embodiments, a spindle rotating apparatus 272 may include only a single spindle portion 274 and multiple spindle rotating apparatuses may be used.

The coating carrier 214 may be lowered onto the spindle portions 274. The nose portions 276 of the spindle portions 274 can enter the cavities 234 through the openings 238 at the spindle connecting side 224 of the coating carrier 214. The nose portions 276 can then mate with the spindle receiving bores 278 of the spindle connecting portions 242 (FIG. 10A), as described above. In some embodiments, the nose portions 276 may be shaped to lift the spindle connecting portions 242 slightly from the cavity walls 250 to facilitate rotation of the spindle connecting portions 242 within the cavities 234. Referring back to FIG. 10A, the spindle portions 274 may also include the gas purge passageway 275 that can connect with the gas purge passageway 268 the glass container connecting portions 254 to provide a pressurized gas to purge the interior volumes 26 of the glass container bodies 12 during a coating operation.

Figure 13:
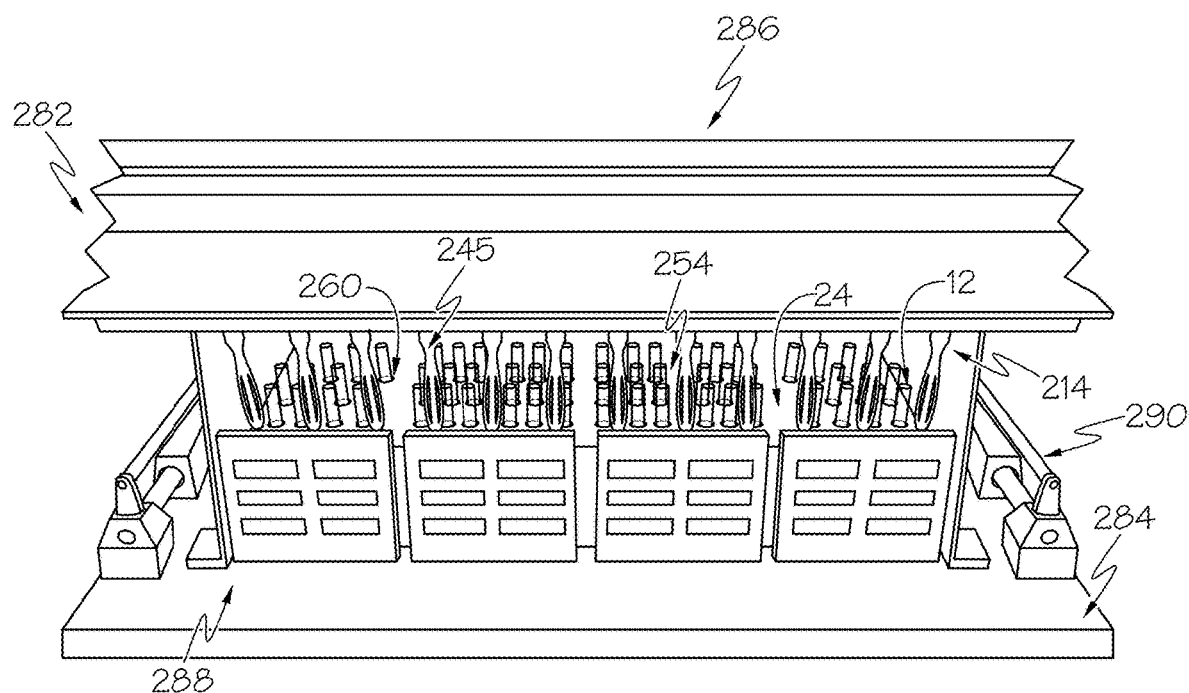
FIG. 13 illustrates a glass loading apparatus used to load glass container bodies on the glass body support assembly of FIG. 8, according to one or more embodiments shown and described herein.
Figure 14:
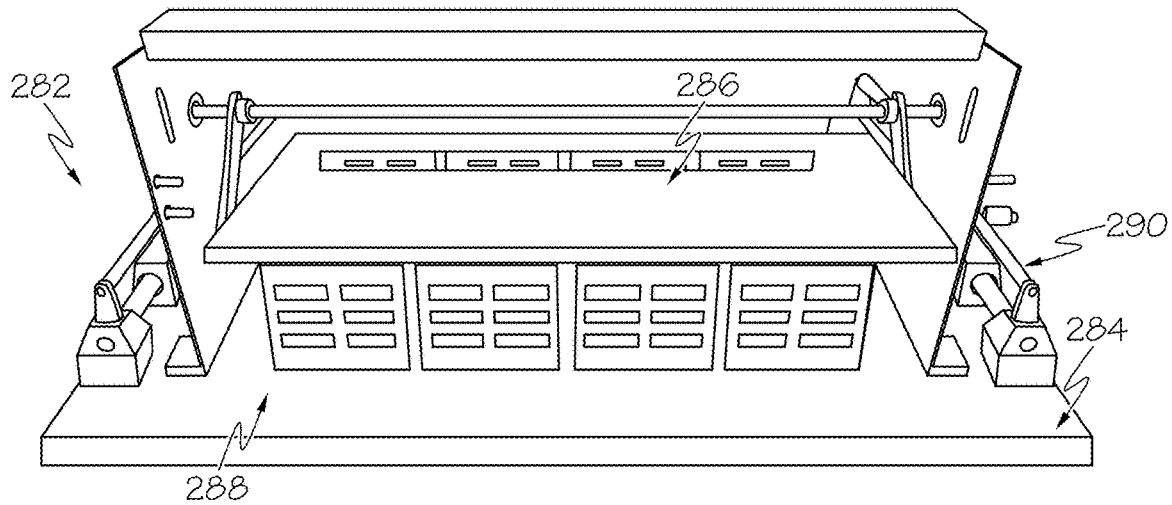
FIG. 14 is another illustration of the glass loading apparatus of FIG. 13.

Referring to FIGS. 13 and 14, an exemplary glass loading apparatus 281 is illustrated that can be used to load the glass container bodies 12 onto the glass body support assemblies 245, such as during the step 212 of FIG. 4, after washing. To this end, it may be desirable that only the glass container connecting portion 254 that is formed of a material suitable for contacting the interior surface 20 of the glass container body 12 come into contact with the glass container bodies 12. The glass loading apparatus 281 may include a loading platform 284 and a carrier receiving fixture 286 located generally above the loading platform 284. The racks 288 of the glass container bodies 12 can be located on the loading platform 284 using any suitable device, such as a robotic arm, overhead crane, or even manually. The racks may be formed of a material suitable for contacting the glass body, such as Delrin®. Alignment features may be provided on the loading platform 284 to properly position the racks 288 relative to the carrier receiving fixture 286.

The carrier receiving fixture 286 is configured to hold the coating carrier 214 (e.g., using the support arms 218 of FIG. 5) in an upside-down fashion with the glass body support assemblies 245 extending toward the loading platform 284. The carrier receiving fixture 286 is moveably mounted to the loading platform 284 by a moveable mount assembly 290 such that the carrier receiving fixture 286 can move relative to the loading platform 284 and the racks 288 located thereon. In some embodiments, the moveable mount assembly 290 may provide forward, back, side and up and down motion for the carrier receiving fixture 286. In other embodiments, only up, down, forward and back motion may be provided for the carrier receiving fixture 286. The carrier receiving fixture 286 may be moveable manually and/or automatically using an actuator.

As can be seen, the glass container bodies 12 may be loaded into the racks 288 with their open bottom ends 24 (FIG. 1) facing the carrier receiving fixture 286. Such an arrangement facilitates insertion of the connecting heads 260 of the glass body support assemblies 245 through the open bottom ends 24 of the glass container bodies 12. Once the carrier receiving fixture 286 including the connecting heads 260 is aligned with the respective glass container bodies 12, the carrier receiving fixture 286 may be lowered, such that the connecting heads 260 are received through the bottom ends 24 and the engaging ribs engage the interior surface 20 of the glass container bodies 12, as shown by FIG. 14. The coating carrier 214 may then be released from the carrier receiving fixture 286, inverted and transferred to the coating station, as described above.

Referring back to FIG. 4, the coating process is represented by step 294, which may be a two-step coating process. Once the glass container bodies 12 are coated, forming the coated glass containers 10, the coated glass containers 10 may be unloaded from the glass body support assemblies 245 for a curing operation at step 298.

Figure 15:
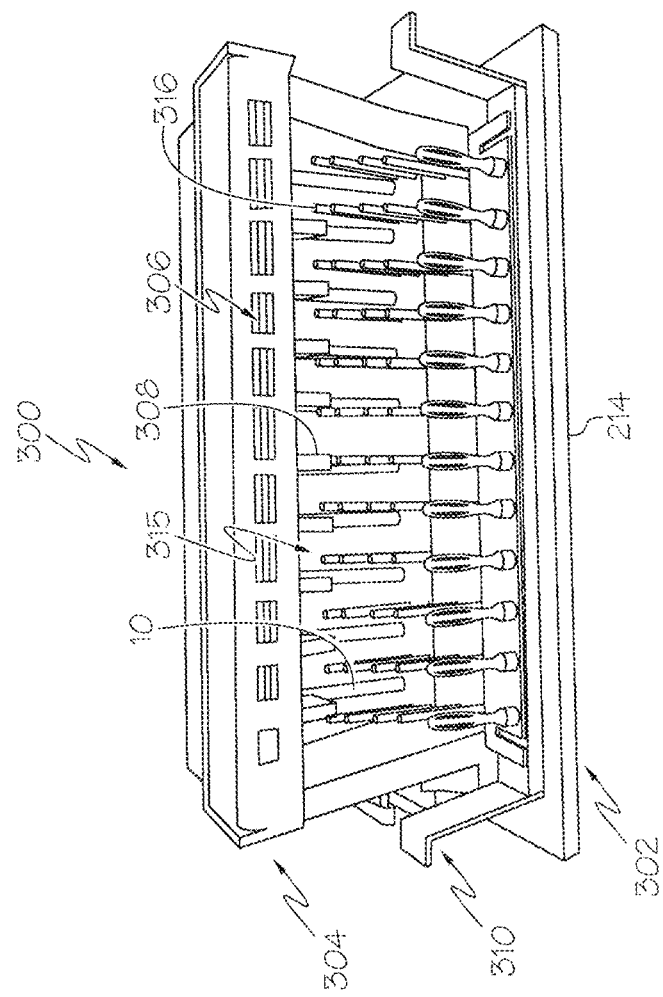
FIG. 15 illustrates a glass unloading apparatus used to unload glass container bodies from the glass support assembly of FIG. 8, according to one or more embodiments shown and described herein.

Referring to FIG. 15, a glass unloading apparatus 300 is illustrated that can be used to unload the coated glass containers 10 after completing the coating process for a curing operation or other operation, such as a setting operation between coating stages. The glass unloading apparatus 300 may include an unloading platform 302 and a gripping head assembly 304 located generally above the unloading platform 302. The coating carrier 214 including the coated glass containers 10 can be located on the unloading platform 302 using any suitable device, such as a robotic arm, overhead crane, or even manually. The gripping head assembly 304 includes a number of gripper mechanisms 306 having gripping arms 308 that are configured to grip the coated glass containers 10. In some embodiments, the number of gripper mechanisms 306 may correspond to the number of coated glass containers 10 (e.g., 12). However, there may be more or less gripper mechanisms 306 than coated glass containers 10. Further, the gripping arms 308 may be formed of any suitable material to contact the coated glass containers 10, such as Delrin®. Alignment features may be provided on the unloading platform 302 to properly position the coating carrier 214 relative to the gripping head assembly 304.

The gripping head assembly 304 is moveably mounted to the unloading platform 302 by a moveable mount assembly 310 such that the gripping head assembly 304 can move relative to the unloading platform 302 and the coating carrier 214 located thereon. In some embodiments, the moveable mount assembly 310 may provide forward, back, side and up and down motion for the gripping head assembly 304. In other embodiments, only up and down motion may be provided for the gripping head assembly 304. The gripping head assembly 304 may be moveable manually and/or automatically using an actuator.

Figure 16:
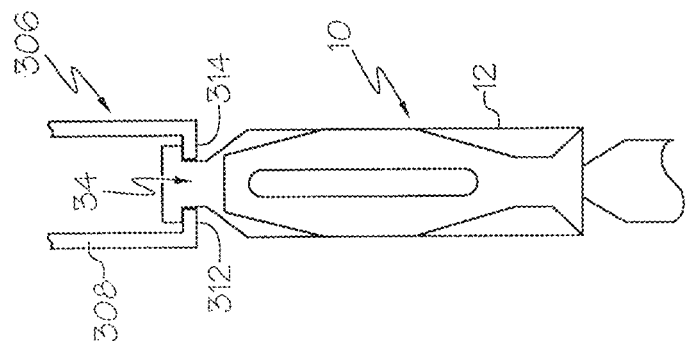
FIG. 16 illustrates a detail view of a gripper mechanism of the glass unloading apparatus of FIG. 15.

Referring to FIG. 16, with the coating carrier 214 and the coated glass containers 10 aligned with the gripper mechanisms 306, the gripping head assembly 304 may be lowered toward the coating carrier 214. In some embodiments, the gripping arms 308 may have an open position to receive the coated glass containers 10 and a closed position to engage the coated glass containers 10. FIG. 16 illustrates the gripping arms 308 in the closed position where fingers 312 and 314 of the gripping arms 308 engage the neck region 34 of the glass container body 12. The gripping arms 308 may be opened and closed by any suitable processes, such as using actuators or manually opening and closing using a mechanism. The gripping arms 308, in some embodiments, may be spring biased toward the closed position, which can provide enough gripping force to unload the coated glass containers 10 from their glass body support assemblies 245. Referring back to FIG. 15, once removed from the glass body support assemblies 245, the coated glass containers 10 may be placed on a rack 315 having projections 316 (e.g., pins) formed of a material suitable to contact the coated glass containers 10 and for heated temperatures (e.g., up to 150° C.), such as graphite.

Referring back to FIG. 4, once unloaded from the coating carrier 214, the coated glass containers 10 may be cured at step 298, inspected at step 318 and packed at step 320 for shipping.

Figure 17:
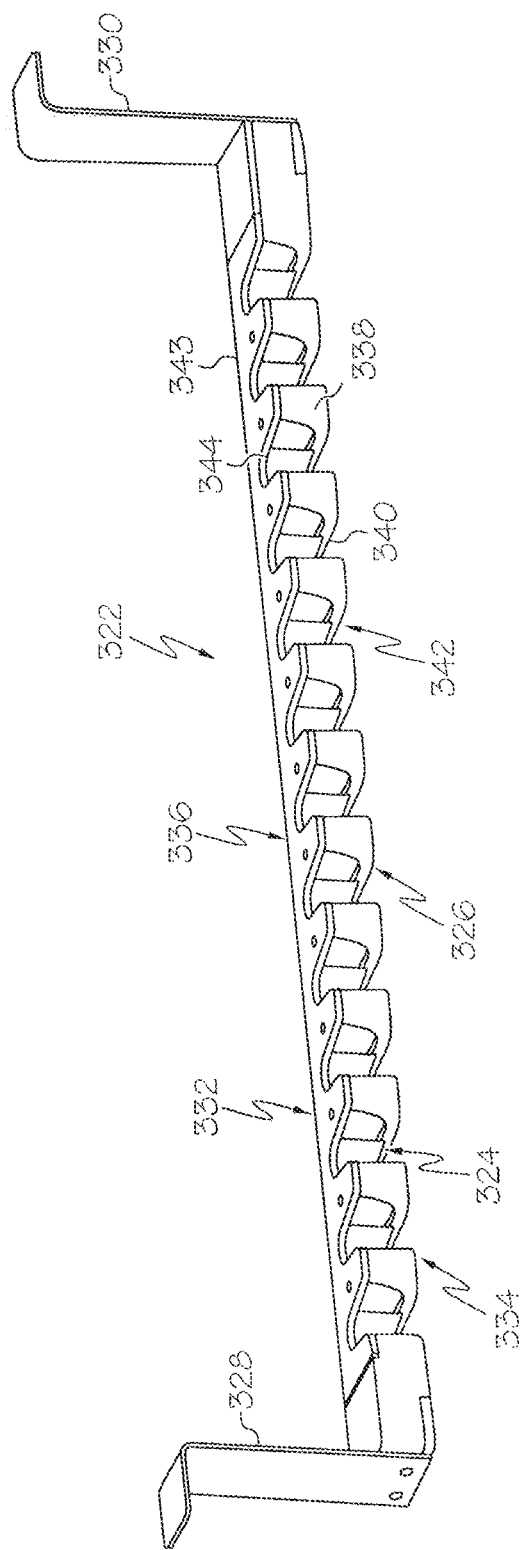
FIG. 17 illustrates a perspective view of another embodiment of a coating carrier that is open-sided, according to one or more embodiments shown and described herein.

Referring to FIG. 17, another embodiment of a coating carrier 322 is an open-sided structure that allows the spindle connectors 240 of the glass body support assemblies 245 to be slid into and out of cavities 324 of the coating carrier 322. Similar to the coating carrier 214 described above, the coating carrier 322 includes a coating base 326 that extends between a pair of support arms 328 and 330. Extending between a glass body supporting side 332 and a spindle connector side 334 are a series of spindle connector receiving features 336 that include the cavities 324. A support body 338 provides a ledge 340 that defines openings 342 at the spindle connector side and a connector plate 343 provides a ledge 344 that provides openings 346 at a glass supporting side 348. The ledges 340 and 344 can be provided to trap the spindle connectors 240 in the cavities 324 in a fashion similar to that described above.

Figure 18:
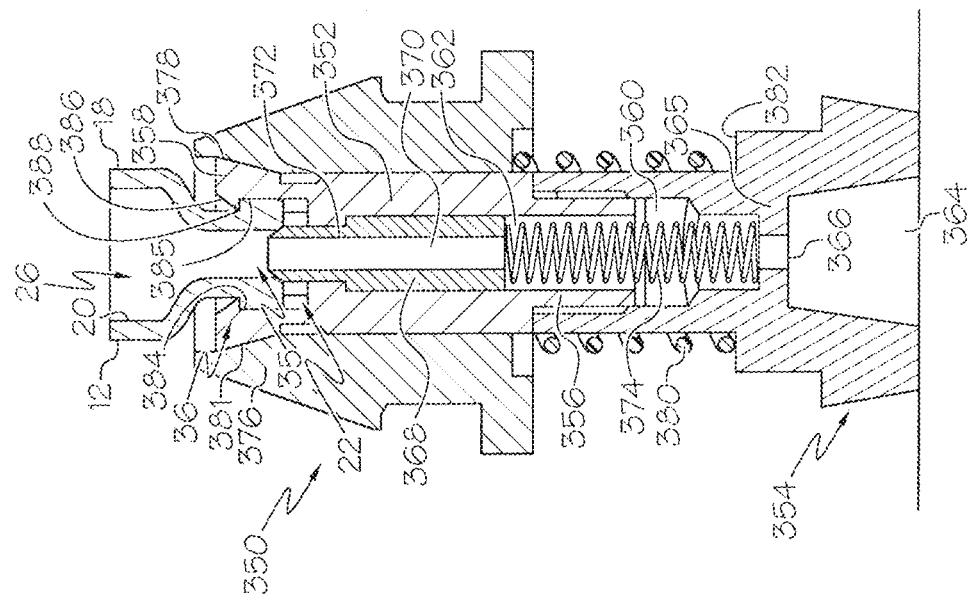
FIG. 18 illustrates a section view of a collet-based glass body support assembly in a closed configuration, according to one or more embodiments shown and described herein.

Referring to FIG. 18, while a pin-based glass body support assembly 245 is described above that is inserted into the interior volume 26 of the glass container body 12, another embodiment of a glass body support assembly 350 is collet-based and engages the exterior surface 18 of the glass container body 12 as opposed to the interior surface 20. The glass body support assembly 350 includes a collet body 352 that is connected to a spindle connector 354 that is similar to the spindle connector 240 described above. The collet body 352 includes a shaft portion 356 that is received by and connected to the spindle connector 354 and clamping fingers 358 that are used to clamp against the flange region 36 of the glass container body 12. The shaft portion 356 is received within a shaft receiving bore 360 of the spindle connector 354. A gas purge passageway 362 is provided through the shaft portion 356 and is in communication with a spindle receiving bore 364 of the spindle connector 354 via an opening 366 provided through a spring seating wall 365 that divides the spindle receiving bore 364 and the shaft receiving bore 360.

A plunger 368 is provided in the gas purge passageway 362 and likewise includes a gas purge passageway 370 in communication with the gas purge passageway 362. The plunger 368 includes a tapered nose portion 372 that can be at least partially received by the opening 35 at the top end 22 of the glass container body 12. The plunger 368 may be spring-biased toward the glass container body 12 by a spring 374 that is seated on the spring seating wall 365.

An outer collet closer sleeve 376 is slidingly received about the collet body 352. The outer collet closer sleeve 376 includes an inwardly tapered region 378 that is used to apply a closing force against an outwardly tapered region 381 of the clamping fingers 358 to urge the clamping fingers 358 radially inward toward the flange region 36 of the glass container body 12. The outer collet closer sleeve 376 may be spring biased toward an extended position using an outer spring 380 that is seated against an outer seating surface 382 provided by the spindle connector 354.

FIG. 18 illustrates the glass body support assembly 350 in a closed configuration with the outer collet closer sleeve 376 in the extended position such that the clamping fingers 358 are forced against the flange region 36 of the glass container body 12. In the illustrated embodiment, the clamping fingers 358 include a flange abutting portion 385 that abuts a side surface 384 of the flange region 36 and a flange hooking portion 386 extending outwardly from the flange abutting portion 385 and hooking around an underhang surface 388 of the flange region 36. The outer collet closer sleeve 376 can also provide a shield that protects the neck and flange regions 34 and 36 from coating material during the coating process. As described above, the plunger 368 is spring-biased toward the glass container body 12, which also stabilizes the glass container body 12 in the illustrated vertical orientation.

Figure 19:
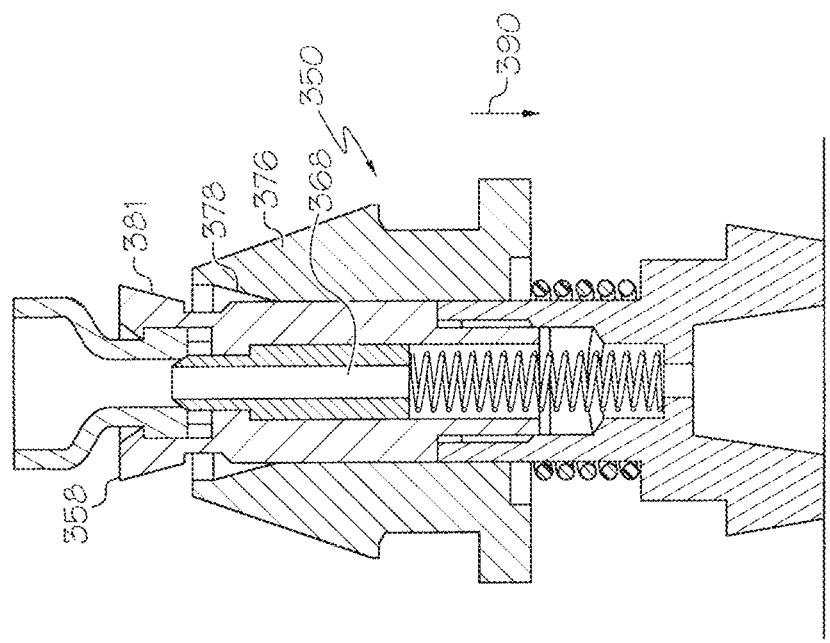
FIG. 19 illustrates another section view of the collet-based glass support assembly of FIG. 18 in an open configuration.

Referring now to FIG. 19, the glass body support assembly 350 is illustrated in an open configuration with the outer collet closer sleeve 376 forced away from the outwardly tapered region of the clamping fingers 358 in the direction of arrow 390. In some embodiments, the force may be applied to the outer collet closer sleeve 376 manually. In other embodiments, the force may be applied to the outer collet sleeve 376 mechanically or by any other suitable mechanism, such as pneumatically, for example, in order to automate the opening process.

As can be seen, in the open configuration, the inwardly tapered region 378 of the outer collet closer sleeve 376 is removed or spaced axially from the outwardly tapered region 381 of the clamping fingers 358. Removing the inwardly tapered region 378 of the outer collet closer sleeve 376 from the outwardly tapered region 381 of the clamping fingers 358 removes the radial force applied to the clamping fingers 358 by the outer collet closer sleeve 376 and allows flexing of the clamping fingers 358 outwardly, away from one another to allow release of the coated glass containers 10. The plunger 368, being spring-biased toward the glass container body 12 can also help maintain the glass body in the illustrated vertical orientation, even with the collet closer sleeve 376 in the open configuration. This is because the clamping fingers 358 can still apply a sufficient radial force against the flange region 36 along with the plunger to maintain the vertical orientation of the glass container body 12, even with the outer collet closer sleeve 376 in the open configuration.

Figure 20:
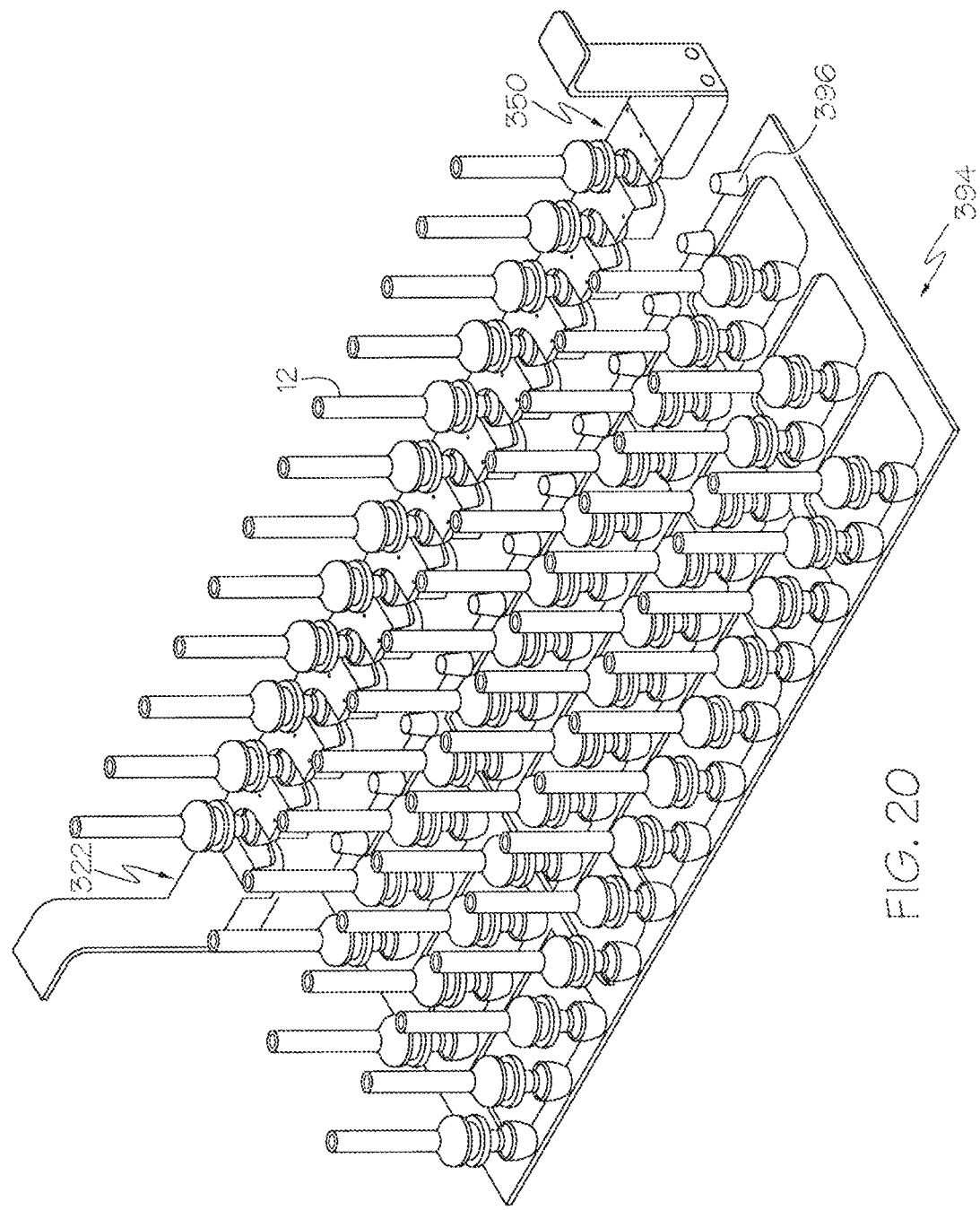
FIG. 20 illustrates an unloading operation of the glass body support assemblies of FIG. 18 onto a heating rack, according to one or more embodiments shown and described herein.

Referring now to FIG. 20, the open-sided arrangement of the coating carrier 322 may facilitate unloading of the entire glass body support assembly, in this example, glass body support assembly 350 from the coating carrier 322 through open side 392. The glass body support assembly 350 with the glass container bodies 12 connected thereto may be moved to a heating rack 394 where the coated glass container bodies 12 can be heated for a setting and/or curing operation without releasing the glass container bodies 12 from the glass body support assemblies 350. The glass body support assemblies 350 may be supported in the illustrated upright positions on support projections 396 that are provided by the heating rack 394.

Figure 21:
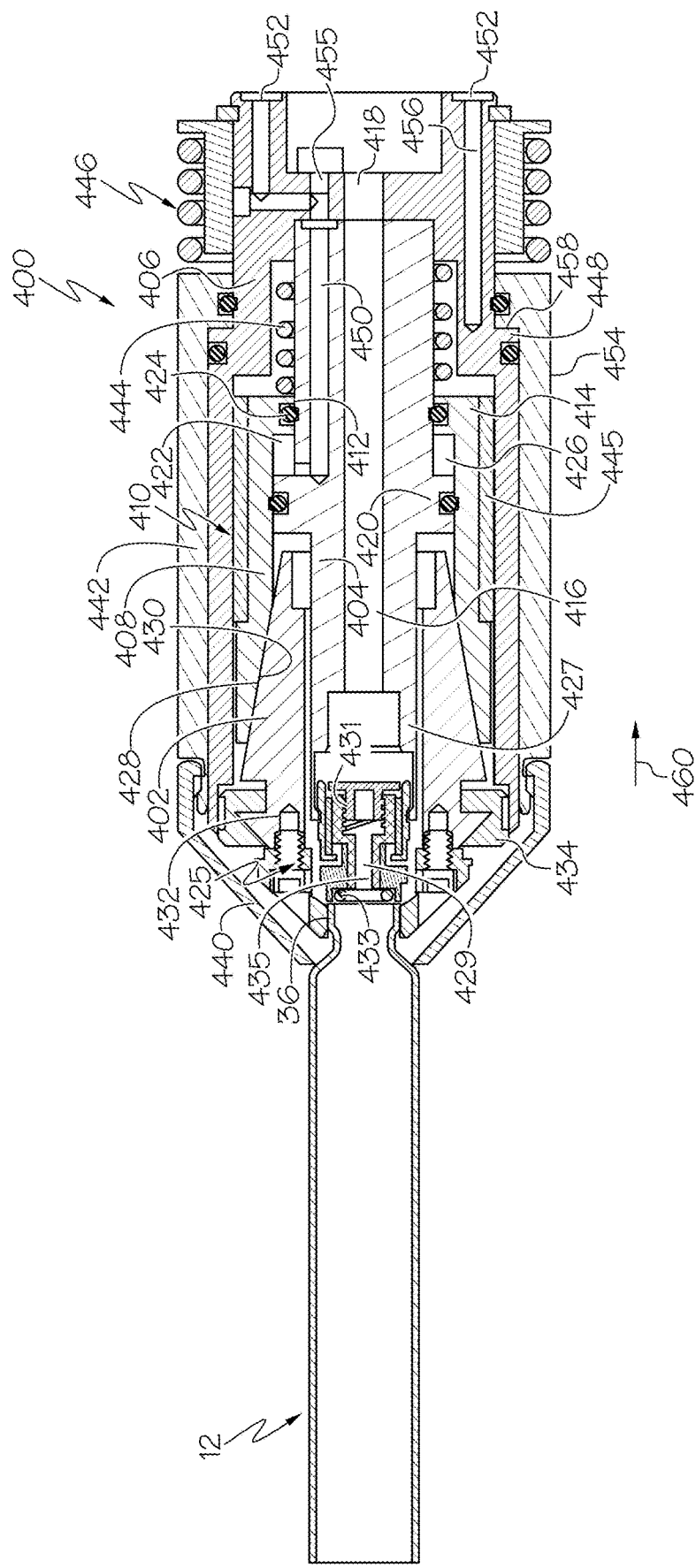
FIG. 21 illustrates a section view of another embodiment of a collet-based glass body support assembly, according to one or more embodiments shown and described herein.

Referring to FIG. 21, another embodiment of a glass body support assembly 400 that is collet-based is illustrated. The glass body support assembly 400 may be suitable for securely holding the glass container body 12 at relatively high rotational speeds (e.g., up to about 3500 rpm or more), for glass container bodies 12 having relatively large height H to width W ratios (FIG. 1) and/or for glass bodies having various mass imbalances due to manufacturing and design needs. The glass body support assembly 400 may also be suitable for an automated loading process using, for example, a pneumatic system for opening and closing the glass body support assembly 400.

The glass body support assembly 400 includes a collet body 402 that is positioned about an inner shaft 404. The inner shaft 404 may provide a central axis for the glass body support assembly 400 and is connected to a spindle shaft 406 that, in turn, connects to a spindle rotating apparatus. A collet closer 408 may be received within a bore 410 of the spindle shaft 406 that extends about the inner shaft 404. The inner shaft 404 has a proximal portion that extends through an opening 412 in a wall 414 of the collet closer 408 extending transverse to the central axis, connecting with the spindle shaft 406 and aligning a gas purge passageway 416 through the inner shaft 404 with a gas purge passageway 418 through the spindle shaft 406. A sealing portion 420 of the inner shaft 404 may engage an inner wall 422 of the collet closer 408 to provide a seal therebetween, for example, using a seal 424, which provides a pressurized gas chamber 426 that can be used to place the glass body support assembly 400 in open and closed configurations.

A plunger assembly 425 may be connected to a distal end 427 of the inner shaft 404. The plunger assembly 425 may include a plunger 429 that is biased toward the flange region 36 of the glass container body 12 by a spring 431. The plunger 429 includes a gas purge passageway 435 that extends therethrough that connects to the gas purge passageway 416 through the inner shaft 404. A seal 433 (e.g., an O-ring) may be provided to seal the plunger against the flange region 36 of the glass body, while also allowing for delivery of a gas into the glass container body 12 for a purge operation.

The collet body 402 increases in outer diameter thereby providing an outwardly tapered region 428. The collet closer 408 includes an inwardly tapered region 430 that is used to apply a closing force against the outwardly tapered region 428 of the collet body 402. The collet body 402 has a collet nut insertion end 432 that is inserted into a collet nut 434 that constrains outward radial movement of the collet body 402 at the collet nut insertion end 432, but allows inward radial movement of the collet body 402 at the collet nut insertion end 432 in response to force applied by the collet closer 408. The collet nut 434 can also be threadably connected to the spindle shaft 406 to position the collet body 402 therein and inhibit axial movement of the collet body 402 relative to the collet closer 408.

Figure 22:
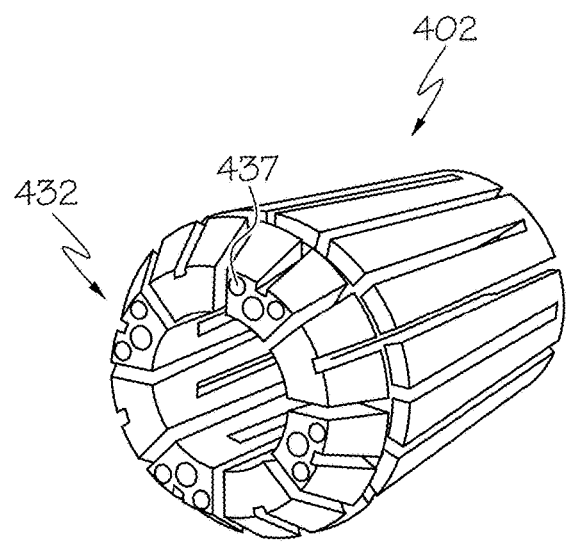
FIG. 22 illustrates a perspective view of a collet body without clamping fingers for the glass support assembly of FIG. 21, according to one or more embodiments shown and described herein.
Figure 23:
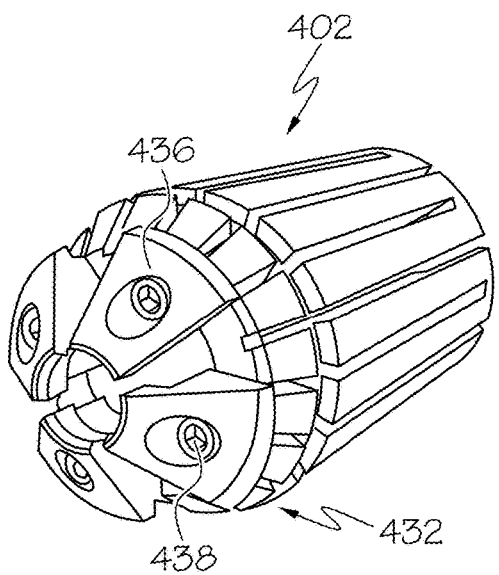
FIG. 23 illustrates a perspective view of the collet body of FIG. 22 with clamping fingers attached.

Referring also to FIGS. 22 and 23 that show the collet body 402 in isolation, the collet body 402 may be an ER-type collet body that, itself, provides an outward bias at the collet nut insertion end 432 due to the one-piece nature of the collet body 402. The collet body 402 may be formed of a metal, which can be unsuitable for contact with the glass container body 12. To this end, the collet body 402 may be provided with clamping fingers 436 (FIG. 23) that can be connected to the collet body 402, for example, using threaded holes 437 (FIG. 22) and fasteners 438. The clamping fingers 436 may be formed of a material that is suitable for contacting the glass container body 12, such as Delrin®.

Figure 24:
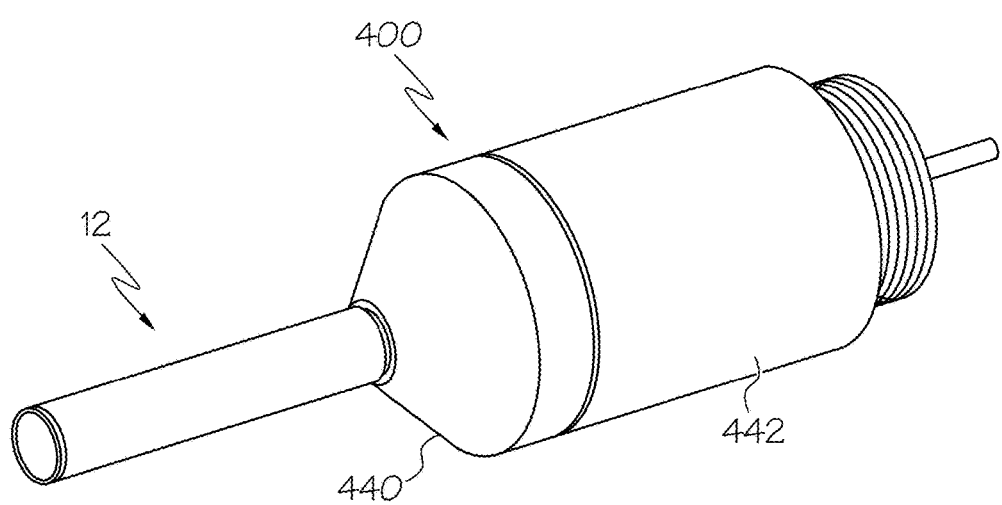
FIG. 24 illustrates a perspective view of the glass body support assembly of FIG. 21.

Referring again to FIG. 21, the glass body support assembly 400 includes an outer shield 440 that can surround the glass container body 12. In an extended configuration, the outer shield 440 can protect the neck and flange regions 34 and 36 from coating material during the coating process. The outer shield 440 may be connected to a shield retractor shaft 442. As will be described in greater detail below, the shield retractor shaft 442 can be used to place the outer shield 440 in the extended and retracted configurations. FIG. 24 illustrates the shield retractor shaft 442 and the outer shield 440 positioned about the glass container body 12.

In operation, the glass body support assembly 400 is illustrated in the closed configuration in FIG. 21. In the closed configuration, a spring 444 biases the inwardly tapered region 430 of the collet closer 408 toward the outwardly tapered region 428 of the collet body 402. A bushing 445 can facilitate movement of the collet closer relative to the collet body 402. The increasing width of the collet body 402 due to the outwardly tapered region 428 results in a radially inward force to be applied against the collet body 402, thereby deflecting the clamping fingers 436 toward the flange region 36 of the glass container body 12. Changing the spring force applied by the spring 444 can increase or decrease the clamping force against the flange region 36. The outer shield 440 is biased to the extended position by a spring 446. A stop surface 448 may be provided by the spindle shaft 406 that limits a distance the outer shield 440 can extend. The plunger 429 of the plunger assembly 425 is also biased toward the extended position by the spring 431 such that the seal 433 seals against the flange region 36 of the glass container body 12. Such a sealing arrangement can not only be used to stabilize the glass container body 12 during rotation, but also inhibit passage of coating material in the interior of the glass container body 12.

The glass body support assembly 400 may be placed in the open configuration using any suitable actuator system. In the illustrated example, the glass body support assembly 400 may be placed in the open configuration using pneumatic pressure. For example, an air pressure passage 450 may be in communication with an air pressure inlet 452 for supplying pressurized air to the gas chamber 426, which can be used to force the collet closer 408 proximally toward an inner seating surface 454 provided by the spindle shaft 406, which releases or lessens the force applied by the collet closer 408 against the collet body 402 and the clamping fingers 436 connected thereto. An openable and closeable air outlet 455 is provided that can release the air pressure in the gas chamber 426, thereby allowing the spring 444 to move the collet closer 408 distally to apply a radial force against the collet body 402, as described above.

Further, the outer shield may be placed in the retracted position using pneumatic pressure. For example, another air passageway 456 may be in communication with another air pressure inlet 452 for supplying pressurized air to another gas chamber 458 provided between the stop surface 448 of the spindle shaft 406 and the shield retractor shaft 442 connected to the outer shield 440. Providing the pressurized air to the gas chamber 458 moves the shield retractor shaft 442 and the outer shield 440 proximally in the direction of arrow 460, which exposes the shoulder region 32 and the neck region 34 distal of the outer shield 440. This arrangement can expose uncoated areas and graspable regions to remove the coated glass container 10 from the glass body support assembly 400. The air pressure can also be released from the gas chamber 458, thereby allowing a spring 464 to move the shield retractor shaft 442 and the outer shield 440 distally such that the outer shield 440 at least partially surrounds and shields the flange region 36, neck region 34 and shoulder region 32 of the glass container body 12, as described above.

Figure 25:
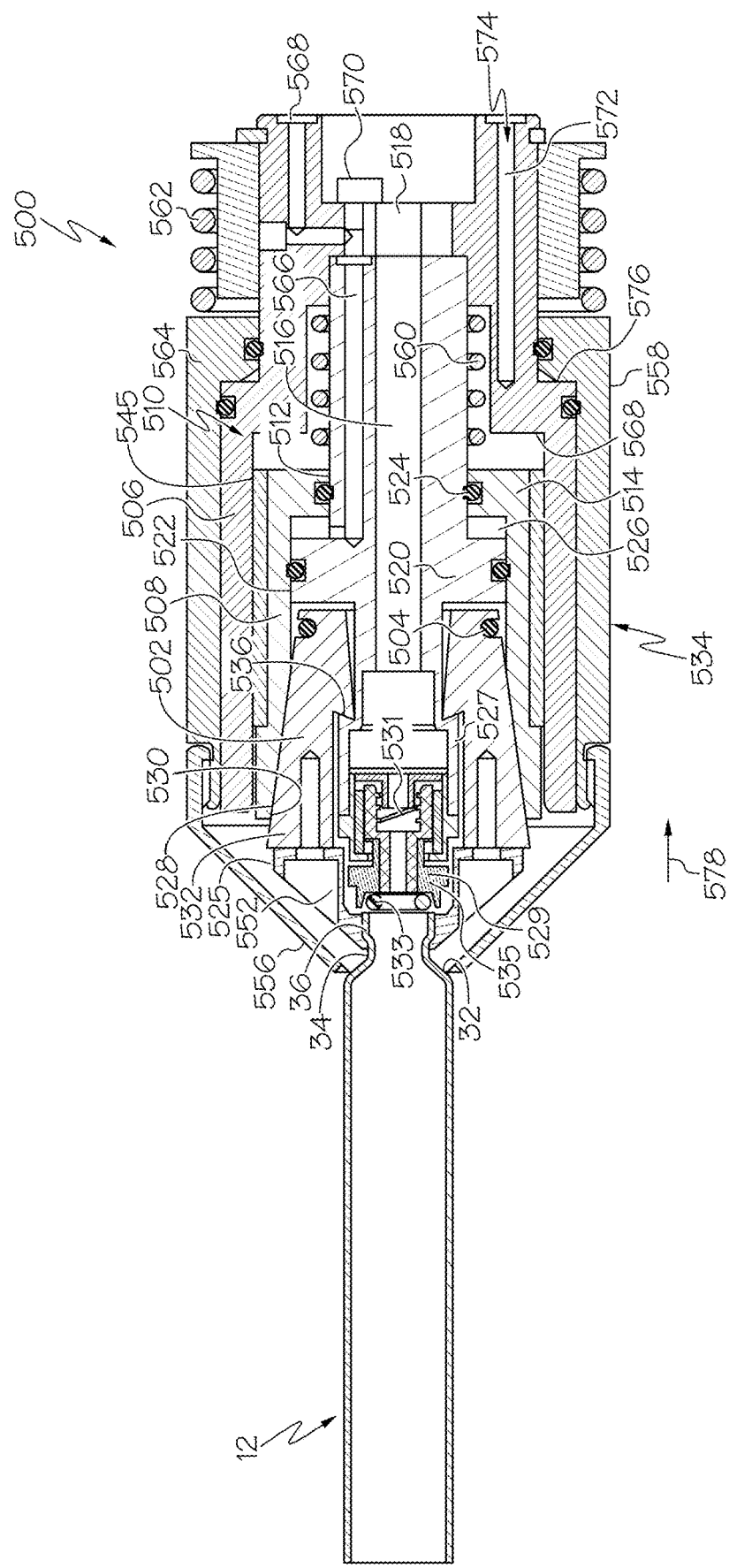
FIG. 25 illustrates a section view of another collet-based glass support assembly, according to one or more embodiments shown and described herein.

Referring to FIG. 25, another embodiment of a glass body support assembly 500 that is collet-based is illustrated. The glass body support assembly 500 includes many of the features described above in relation to glass body support assembly 400, but, in this example, a collet body 502 is segmented, as opposed to the continuous ER-type collet body described above. The glass body support assembly 500 includes the collet body 502 that is positioned about an inner shaft 504. Again, the inner shaft 504 may provide a central axis for the glass body support assembly 500 and is connected to a spindle shaft 506 that, in turn, connects to a spindle rotating apparatus. A collet closer 508 may be received within a bore 510 of the spindle shaft 506 that extends about the inner shaft 504. The inner shaft 504 has a proximal portion that extends through an opening 512 in a wall 514 of the collet closer 508 extending transverse to the central axis, connecting with the spindle shaft 506 and aligning a gas purge passageway 516 through the inner shaft 504 with a gas purge passageway 518 through the spindle shaft 506. A sealing portion 520 of the inner shaft 504 may engage an inner wall 522 of the collet closer 508 to provide a seal therebetween, for example, using a seal 524, which provides a pressurized gas chamber 526 that can be used to place the glass body support assembly 500 in open and closed configurations.

A plunger assembly 525 may be connected to a distal end 527 of the inner shaft 504. The plunger assembly 525 may include a plunger 529 that is biased toward the flange region 36 of the glass container body 12 by a spring 531. The plunger 529 includes a gas purge passageway 535 that extends therethrough that connects to the gas purge passageway 516 through the inner shaft 504. A seal 533 (e.g., an O-ring) may be provided to seal the plunger against the flange region 36 of the glass container body 12, while also allowing for delivery of a gas into the glass container body 12 for a purge operation.

The collet body 502 increases in outer diameter thereby providing an outwardly tapered region 528. The collet closer 508 includes an inwardly tapered region 530 that is used to apply a closing force against the outwardly tapered region 528 of the collet body 502. The collet body 502 has an inwardly deflectable end 532 that allows inward radial movement of the collet body 502 in response to force applied by the collet closer 508. Unlike the collet body 402, which is constrained axially using a collet nut 434, the collet body 502 engages a collet pivot structure 534 that, in the illustrated embodiment, is provided by the inner shaft 504. As can be seen, the collet pivot structure 534 is somewhat hook-shaped that engages a cooperating hook-shaped collet pivot structure 536 provided by the collet body 502. The cooperating collet pivot structures 534 and 536 inhibit axial movement of the collet body 502 as the collet closer 508 applies a closing force against the outwardly tapered region 528 of the collet body 502.

Figure 26:
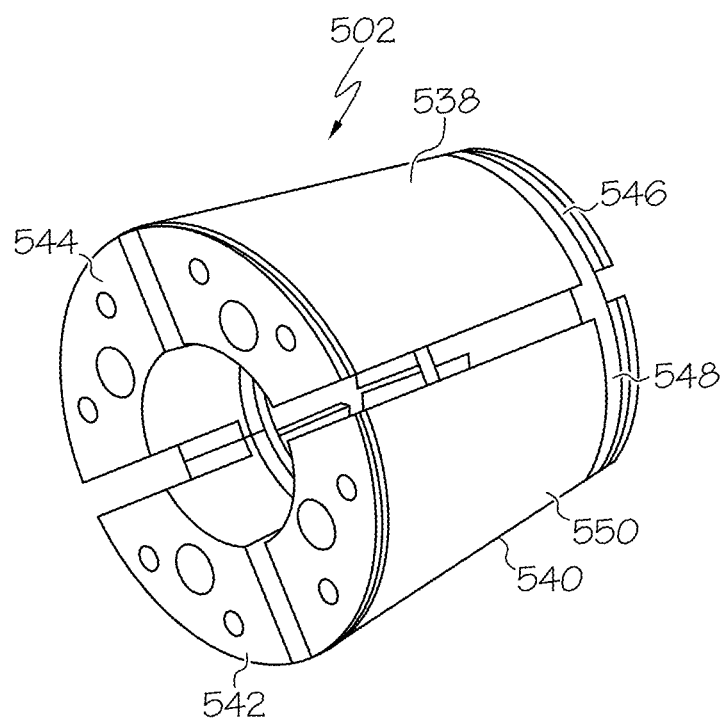
FIG. 26 illustrates a perspective view of a collet body without clamping fingers for the glass support assembly of FIG. 25, according to one or more embodiments shown and described herein.
Figure 27:
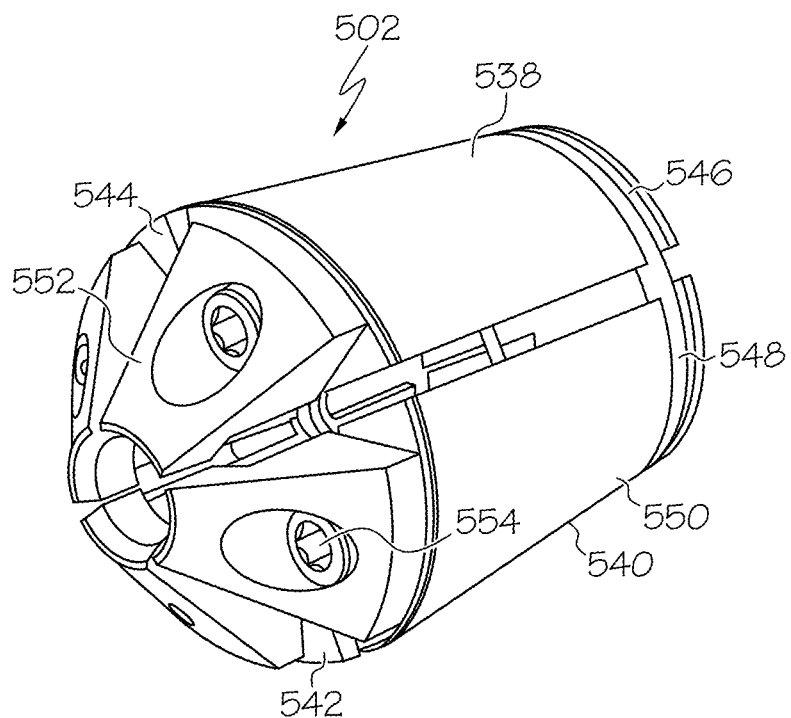
FIG. 27 illustrates a perspective view of the collet body of FIG. 26 with clamping fingers attached.

Referring also to FIGS. 26 and 27 that show the collet body 502 in isolation, the collet body 502 may be a segmented-type collet body that is formed by separate collet segments 538, 540, 542 and 544 forming a multi-piece collet body. As one example, a preform collet body may be formed as a tube and then segmented along two perpendicular planes into the collet segments 538, 540, 542 and 544 using any suitable process such as EDM or other suitable process. A support groove 546 may be provided along a periphery of each collet segment 538, 540, 542 and 544. The support grooves 546 may align to receive a continuous biasing member, such as a garter spring 548. The garter spring 548 may be located at a proximal end 550 of the collet segments 538, 540, 542 and 544, tying them together, and biasing the collet body 502 toward an open configuration.

Similar to above, the collet body 502 may be formed of a metal, which can be unsuitable for contact with the glass container body 12. To this end, the collet body 502 may be provided with clamping fingers 552 (FIG. 27) that can be connected to the collet body 502, for example, using threaded holes (FIG. 26) and fasteners 554.

Referring again to FIG. 25, the glass body support assembly 500 includes an outer shield 556 that can surround the glass container body 12. In an extended configuration, the outer shield 556 can protect the neck and flange regions 34 and 36 from coating material during the coating process. The outer shield 556 may be connected to a shield retractor shaft 558. The shield retractor shaft 558 can be used to place the outer shield 556 in the extended and retracted configurations.

In operation, the glass body support assembly 500 is illustrated in the closed configuration in FIG. 25. In the closed configuration, a spring 560 biases the inwardly tapered region 530 of the collet closer 508 toward the outwardly tapered region 528 of the collet body 502. A bushing 545 can facilitate movement of the collet closer 508 relative to the collet body 502. The increasing width of the collet body 502 due to the outwardly tapered region 528 results in a radially inward force to be applied against the collet body 502, thereby deflecting the clamping fingers 552 toward the flange region 36 of the glass container body 12. Changing the spring force applied by the spring 560 can increase or decrease the clamping force against the flange region 36. The outer shield 556 is biased to the extended position by a spring 562. A stop surface 564 may be provided by the spindle shaft 506 that limits a distance the outer shield 556 can extend. The plunger 529 of the plunger assembly 525 is also biased toward the extended position by the spring 531 such that the seal 533 seals against the flange region 36 of the glass container body 12. Such a sealing arrangement can not only be used to stabilize the glass container body 12 during rotation, but also inhibit passage of coating material in the interior of the glass container body 12.

The glass body support assembly 500 may be placed in the open configuration using any suitable actuator system. In the illustrated example, the glass body support assembly 400 may be placed in the open configuration using pneumatic pressure. For example, an air pressure passage 566 may be in communication with an air pressure inlet 568 for supplying pressurized air to the gas chamber 526, which can be used to force the collet closer 508 proximally toward an inner seating surface 569 provided by the spindle shaft 506, which releases or lessens the force applied by the collet closer 508 against the collet body 502 and the clamping fingers 552 connected thereto. An openable and closeable air outlet 570 is provided that can release the air pressure in the gas chamber 526, thereby allowing the spring 562 to move the collet closer 508 distally to apply a radial force against the collet body 502, as described above.

Further, the outer shield 556 may be placed in the retracted position using pneumatic pressure. For example, another air passageway 572 may be in communication with another air pressure inlet 574 for supplying pressurized air to another gas chamber 576 provided between the stop surface 564 of the spindle shaft 506 and the shield retractor shaft 558 connected to the outer shield 556. Providing the pressurized air to the gas chamber 576 moves the shield retractor shaft 558 and the outer shield 556 proximally in the direction of arrow 578, which exposes the shoulder region 32 and the neck region 34 distal of the outer shield 556. This arrangement can expose uncoated areas and graspable regions to remove the coated glass container 10 from the glass body support assembly 500. The air pressure can also be released from the gas chamber 576, thereby allowing the spring 562 to move the shield retractor shaft 558 and the outer shield 556 distally such that the outer shield 556 at least partially surrounds and shields the flange region 36, neck region 34 and shoulder region 32 of the glass container body 12, as described above.

Figure 28:
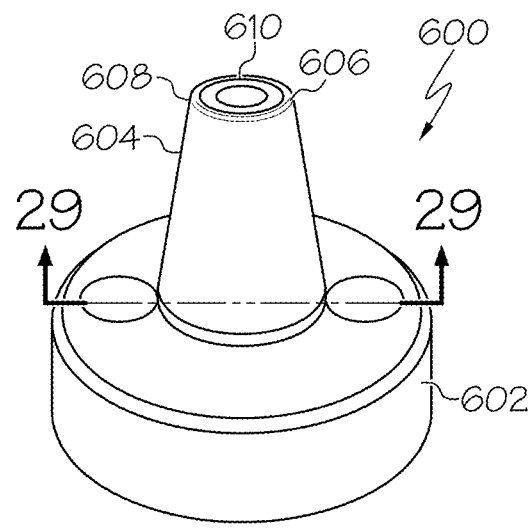
FIG. 28 illustrates a perspective view of a spindle portion having a magnet, according to one or more embodiments shown and described herein.

The glass body support assemblies of FIGS. 19-27 may be suitable for relatively high rotation speeds of the glass body (e.g., of up to 3500 rpm or more). To provide a robust connection between spindle connecting portions of the glass body support assemblies and spindle portions of the spindle rotating apparatuses (FIGS. 11 and 11A), a magnet may be used. Referring to FIG. 28, for example, an embodiment of a spindle portion 600 includes a base 602 and a nose portion 604 in the form of a cone that extends outwardly from the base 602. The nose portion 604 is sized and shaped to be received by a spindle receiving bore of the spindle connecting portion. As described above, the spindle receiving bore may include a corresponding cone shape, such that the spindle connecting portion can bottom out on the nose portion when placed thereon.

Figure 29:
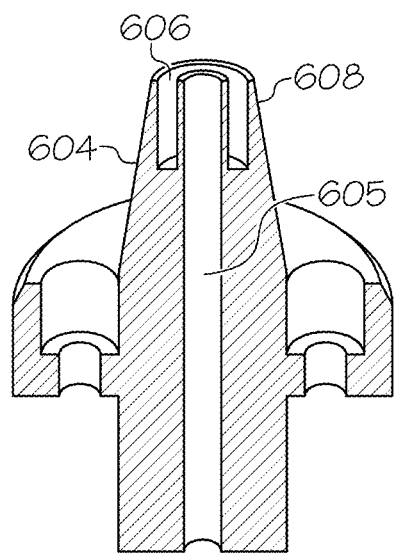
FIG. 29 illustrates a section view the spindle portion of FIG. 28 along line 29-29.

Referring to FIG. 29, the nose portion 604 includes a ring-shaped opening 606 that is provided around the entire end 608 of the nose portion 604. The ring shape allows for a gas purge passageway 605 that extends along an axis of rotation of the nose portion 604. In some embodiments, the opening 606 may be open-ended and is sized to receive a magnet 610. In some embodiments, the magnet 610 may be a permanent magnet. However, other magnet types are contemplated, such as an electromagnet. A suitable ring magnet 610 may be a Neodymium-Iron-Boron N42 ring magnet with a ¼" outside diameter, ⅛" inside diameter, ¼" long and including a Nickel-Copper-Nickel coating. An adhesive, such as Locktite® may be used to secure the magnet 610 in the opening. Other magnets may be used with the selection of magnet strength depending, at least in part on, amount of hold, acceleration to coating speed and ease of unloading. A relatively high magnetic force can make it difficult to remove multiple spindle connecting portions of the glass body support assemblies from the spindle portions. To this end, a gap 279 (FIG. 10A) may be provided between the nose portion 604 and the spindle connecting portion to further tune the magnetic force applied.

Figure 30:
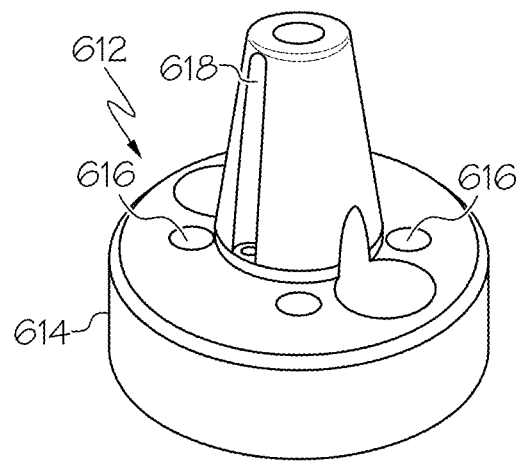
FIG. 30 illustrates a perspective view of another spindle portion having a magnet, according to one or more embodiments shown and described herein.
Figure 31:
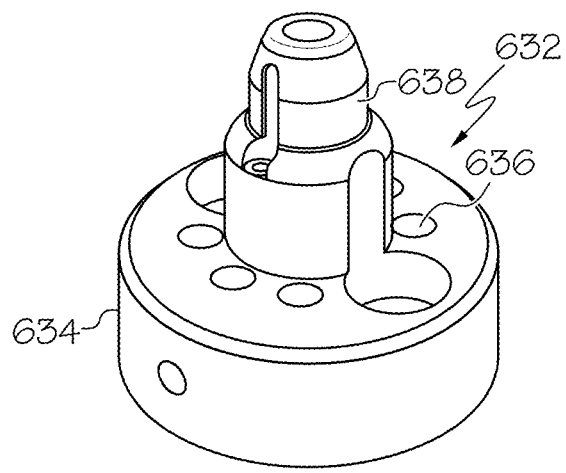
FIG. 31 illustrates a perspective view of another spindle portion having a magnet, according to one or more embodiments shown and described herein.

While a magnet can be placed in the nose portion, FIGS. 30 and 31 illustrate other embodiments of spindle portions 612 and 632 where magnets may be located in bases 614 and 634. In FIG. 30, the spindle portion 612 includes the base portion 614 that includes a number of magnet receiving recesses 616 positioned about nose portion 618 that are selected to attract spindle connecting portions of the glass body support assemblies and inhibit movement of the spindle connecting portions up the nose portion 618. In the example of FIG. 30, four magnets may be used. However, other numbers of magnets may be used, such as shown by FIG. 31 where six magnet recesses 636 are illustrated positioned about nose portion 638.

Figure 32:
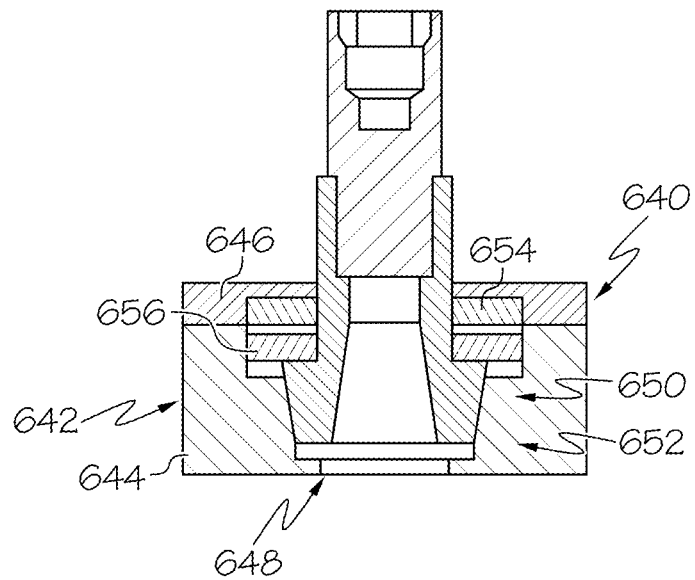
FIG. 32 illustrates a perspective view of another spindle portion having a magnet, according to one or more embodiments shown and described herein.

In embodiments where a magnet is used to attract the spindle connecting portions of the glass body support assemblies, the spindle connecting portions may be formed of a suitable magnetic material, such as a magnetic 400 series stainless steel. However, other embodiments, such as that shown by FIG. 32, may utilize magnets having the same polarity and a repelling force to inhibit movement of the spindle connecting portions up the nose portions. In FIG. 32, a coating carrier 640 includes a coating base 642 that includes a support body 644 and a connector plate 646. A spindle connector 648 is located in a cavity 650 of a spindle connector receiving feature 652 in a fashion similar to that shown by FIG. 5. In this embodiment, however, a pair of magnets 654 and 656 is located in the spindle connector receiving feature 652 having the same polarity such that they repel each other. The magnetic force can be used to maintain a position of the spindle connector 648 on a nose portion of a spindle rotating apparatus. Further, the spindle connector 648 may be formed of a non-magnetic material, such as 300 series stainless steel.

The above-described systems and method can be used to handle and coat a relatively large numbers of glass bodies, reliably meeting coating location targets. The ability to transfer the glass bodies and coated glass containers between stations using, for example, coating carriers can minimize damage to the glass bodies and coated glass containers throughout the coating process. Use of the coating carriers along with the spindle connectors can allow for thermal processing of up to and exceeding 150° C. and even up to and exceeding 300° C. in some embodiments. The above-described systems and methods can be highly flexible for use with glass bodies of different formats. Portability of the coating carriers can allow multiple coating and heating steps to be performed without needing to unload the glass bodies from the glass body support assemblies.

It should now be understood that the glass containers with low frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass body support assembly that supports a glass container body in an upright position, the glass body support assembly comprising:
   a collet body;
   clamping fingers configured to clamp onto a necked-down portion of the glass container body, the collet body having a collet body gas purge passageway extending through which pressurized gas is delivered to an interior of the glass container body; and
   a spring-biased plunger in the collet body gas purge passageway that seals against a flange region of the glass container body.

2. The glass body support assembly of claim 1, wherein the collet body has an outwardly tapered surface, the glass body support assembly further comprising a collet closer having an inwardly tapered surface that engages the outwardly tapered surface of the collet body to apply a radial force to the clamping fingers through the collet body.

3. The glass body support assembly of claim 2, wherein the collet closer is spring-biased toward an extended position to apply the radial force to the clamping fingers through the collet body.

4. The glass body support assembly of claim 1, wherein the collet body gas purge passageway extends through an inner shaft about which the collet body is located.

5. The glass body support assembly of claim 1, wherein the plunger is spring-biased toward the glass container body.

6. The glass body support assembly of claim 5, wherein the plunger has a plunger gas purge passageway that extends therethrough, the plunger gas purge passageway being in communication with the collet body gas purge passageway.

7. The glass body support assembly of claim 1, wherein the clamping fingers are formed as part of the collet body.

8. The glass body support assembly of claim 1, wherein the clamping fingers are separately formed and connected to the collet body.

9. The glass body support assembly of claim 8, wherein the clamping fingers are formed of a material that is different from a material forming the collet body.

10. A glass body support assembly that supports a glass container body in an upright position, the glass body support assembly comprising:
    a collet body having an outwardly tapered surface;
    clamping fingers configured to clamp onto a necked-down portion of the glass container body, the collet body having a collet body gas purge passageway extending therethrough to deliver pressurized gas to an interior of the glass container body;
    a collet closer having an inwardly tapered surface that engages the outwardly tapered surface of the collet body to apply a radial force to the clamping fingers through the collet body;
    wherein the collet closer is spring-biased toward an extended position to apply the radial force to the clamping fingers through the collet body.

11. The glass body support assembly of claim 10 further comprising a plunger that is located in the collet body gas purge passageway.

12. The glass body support assembly of claim 11, wherein the plunger is spring-biased toward the glass container body.

13. The glass body support assembly of claim 12, wherein the plunger has a plunger gas purge passageway that extends therethrough, the plunger gas purge passageway being in communication with the collet body gas purge passageway.

14. The glass body support assembly of claim 10, wherein the clamping fingers are formed as part of the collet body.

15. The glass body support assembly of claim 10, wherein the clamping fingers are separately formed and connected to the collet body.

16. The glass body support assembly of claim 15, wherein the clamping fingers are formed of a material that is different from a material forming the collet body.

17. A glass body support assembly that supports a glass container body in an upright position, the glass body support assembly comprising:
    a collet body having an outwardly tapered surface;
    clamping fingers configured to clamp onto a necked-down portion of the glass container body, the collet body having a collet body gas purge passageway extending therethrough to deliver pressurized gas to an interior of the glass container body; and
    a plunger that is located in the collet body gas purge passageway wherein the plunger is spring-biased toward the glass container body.

18. The glass body support assembly of claim 17, wherein the glass body support assembly further comprising a collet closer having an inwardly tapered surface that engages the outwardly tapered surface of the collet body to apply a radial force to the clamping fingers through the collet body.

19. The glass body support assembly of claim 18, wherein the collet closer is spring-biased toward an extended position to apply the radial force to the clamping fingers through the collet body.

20. The glass body support assembly of claim 17, wherein the plunger has a gas purge passageway that extends therethrough, the gas purge passageway of the plunger being in communication with the gas purge passageway of the collet body.

21. The glass body support assembly of claim 17, wherein the clamping fingers are formed as part of the collet body.

22. The glass body support assembly of claim 17, wherein the clamping fingers are separately formed and connected to the collet body.

23. The glass body support assembly of claim 22, wherein the clamping fingers are formed of a material that is different from a material forming the collet body.

24. The glass body support assembly of claim 17, wherein the collet body is formed as a single-piece, monolithic body.

* * * * *